(12) United States Patent
Lakkis

(10) Patent No.: US 8,537,878 B2
(45) Date of Patent: *Sep. 17, 2013

(54) SPREAD-SPECTRUM CODES GENERATION

(75) Inventor: Ismail Lakkis, San Diego, CA (US)

(73) Assignee: Adeptence, LLC, Los Angeles, CA (US)

( * ) Notice: Subject to any disclaimer, the term of this patent is extended or adjusted under 35 U.S.C. 154(b) by 529 days.

This patent is subject to a terminal disclaimer.

(21) Appl. No.: 12/430,099

(22) Filed: Apr. 26, 2009

(65) Prior Publication Data

US 2010/0272158 A1   Oct. 28, 2010

(51) Int. Cl.
*H04B 1/00*   (2006.01)

(52) U.S. Cl.
USPC ........... 375/146; 375/130; 375/140; 375/141; 375/142; 375/145; 375/148; 375/149; 375/150; 375/343; 714/783

(58) Field of Classification Search
USPC ................. 375/134, 137, 140, 142, 143, 145, 375/148, 149, 152, 343; 370/509, 514, 515
See application file for complete search history.

(56) References Cited

U.S. PATENT DOCUMENTS

| | | | | |
|---|---|---|---|---|
| 6,567,482 B1 * | 5/2003 | Popovic' | ........................ | 375/343 |
| 6,724,835 B1 | 4/2004 | Shenoi | | |
| 7,586,884 B2 | 9/2009 | Awater et al. | | |
| 2002/0183082 A1 * | 12/2002 | Kohlmann | .................... | 455/502 |
| 2005/0215269 A1 | 9/2005 | Cheok | | |
| 2005/0227661 A1 | 10/2005 | Ginzburg | | |
| 2005/0254466 A1 * | 11/2005 | Rudolf et al. | ................. | 370/335 |
| 2007/0113159 A1 * | 5/2007 | Lakkis | .......................... | 714/783 |
| 2008/0062959 A1 * | 3/2008 | Rudolf et al. | ................. | 370/350 |
| 2008/0186948 A1 | 8/2008 | Ramaswamy | | |
| 2008/0298435 A1 * | 12/2008 | Lakkis | .......................... | 375/140 |
| 2009/0204874 A9 * | 8/2009 | Lakkis | .......................... | 714/783 |
| 2010/0080266 A1 | 4/2010 | Zhang | | |
| 2010/0284444 A1 * | 11/2010 | Lakkis | .......................... | 375/150 |
| 2011/0209035 A1 * | 8/2011 | Lakkis | .......................... | 714/783 |

OTHER PUBLICATIONS

Parker, Matthew G., Kenneth G. Paterson and Chintha Tellamburaz. Golay Complementary Sequences. Jan. 19, 2004, pp. 1-18.

* cited by examiner

*Primary Examiner* — Daniel Washburn
*Assistant Examiner* — Eboni Hughes
(74) *Attorney, Agent, or Firm* — Procopio, Cory, Hargreaves & Savitch LLP; Noel C. Gillespie

(57) ABSTRACT

A method for communicating comprises generating at least one spreading code from a preferred Golay generator and/or a preferred generalized Golay generator. The preferred generalized Golay generator may comprise a plurality of preferred Golay generators. The outputs of the preferred Golay generator are logic 0 and 1. Each stage of the preferred Golay generator may comprise a single basic storage unit, such as a Flip-Flop. Generalized Golay codes comprise pseudo-complementary sequences having code lengths that differ from Golay complementary sequences and are characterized by low autocorrelation sidelobes relative to the autocorrelation peak.

28 Claims, 12 Drawing Sheets

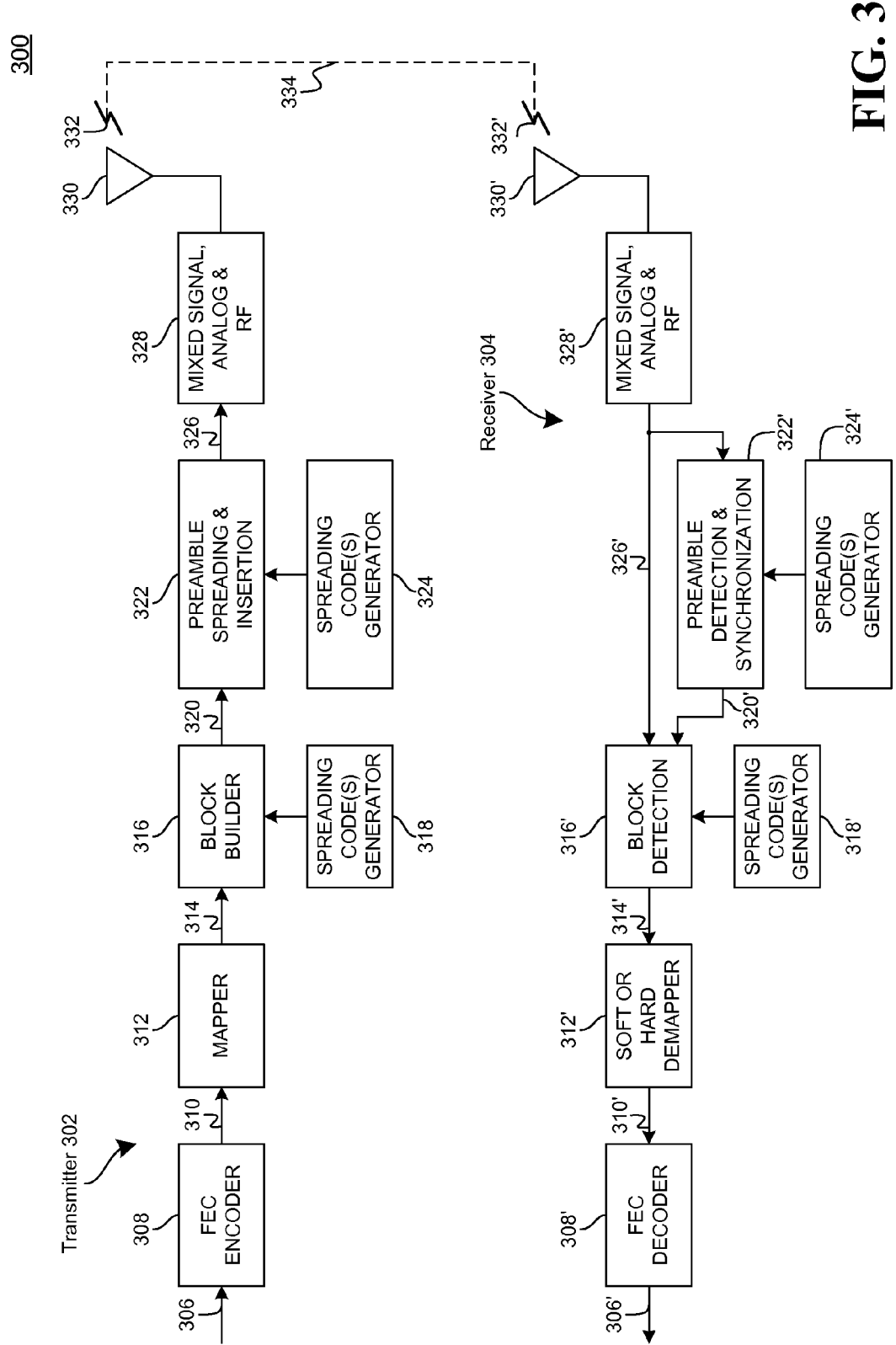

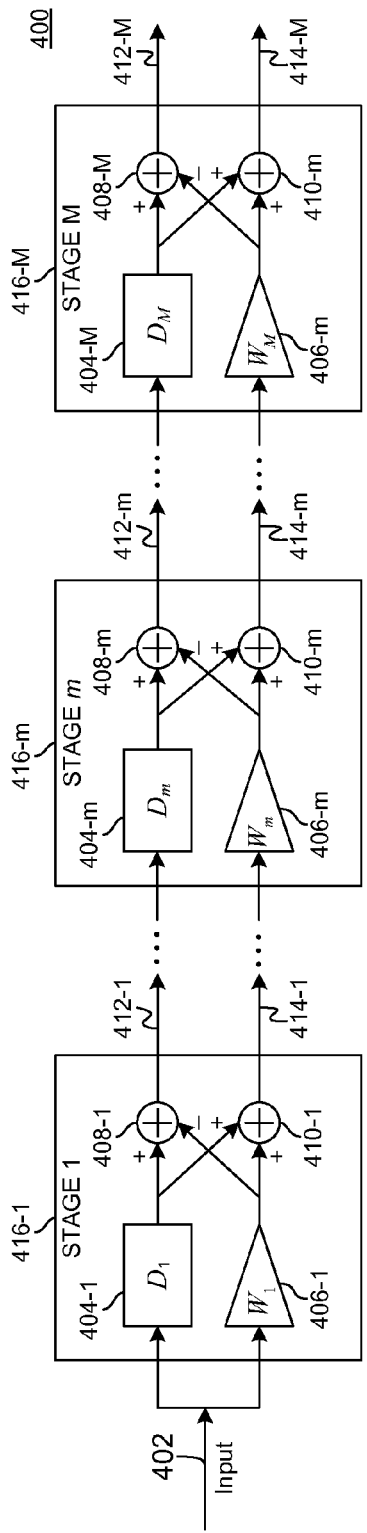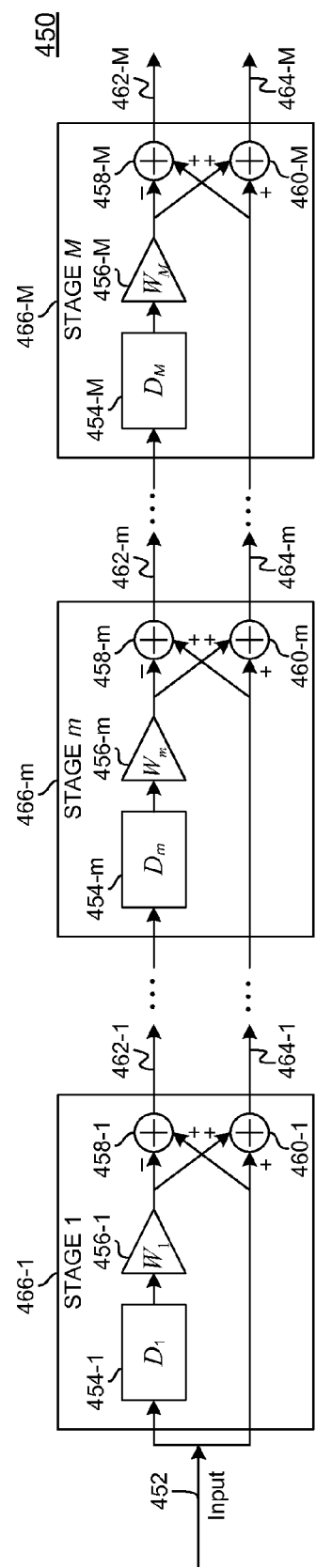
FIG. 4A
FIG. 4B

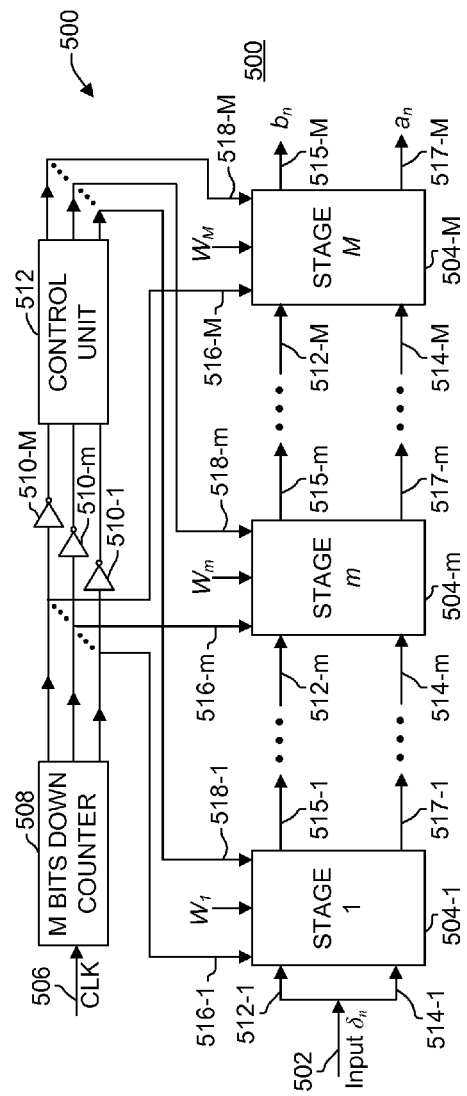
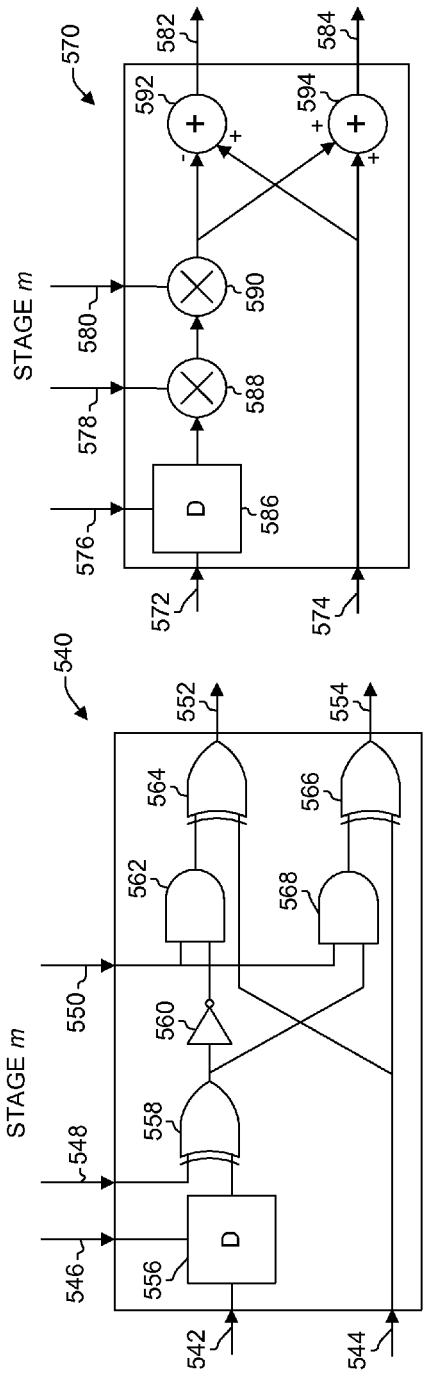

SPREAD-SPECTRUM CODES GENERATION

BACKGROUND

1. Field

Certain aspects of the present disclosure generally relate to spread-spectrum coding and, more particularly, to a method for spreading and de-spreading a signal.

2. Background

Spread-spectrum coding is a technique by which signals generated in a particular bandwidth can be spread in a frequency domain, resulting in a signal with a wider bandwidth. The spread signal has a lower power density, but the same total power as an un-spread signal. The expanded transmission bandwidth minimizes interference to others transmissions because of its low power density. At the receiver, the spread signal can be decoded, and the decoding operation provides resistance to interference and multipath fading.

Spread-spectrum coding is used in standardized systems, e.g. GSM, General Packet Radio Service (GPRS), Enhanced Digital GSM Evolution (EDGE), Code Division Multiple Access (CDMA), Wideband Code Division Multiple Access (WCDMA or W-CDMA), Orthogonal Frequency Division Multiplexing (OFDM), Orthogonal Frequency Division Multiple Access (OFDMA), Time Division Multiple Access (TDMA), Digital European Cordless Telecommunication (DECT), Infrared (IR), Wireless Fidelity (Wi-Fi), Bluetooth, Zigbee, Global Positioning System (GPS), Millimeter Wave (mmWave), Ultra Wideband (UWB), other standardized as well as non-standardized systems, wireless and wired communication systems.

In order to achieve good spreading characteristics in a system using spread spectrum, it is desirable to employ spreading codes which possess a near perfect periodic or aperiodic autocorrelation function, i.e. low sidelobes level as compared to the main peak, and an efficient correlator-matched filter to ease the processing at the receiver side. Spreading codes with high peak and low sidelobes level yields better acquisition and synchronization properties for communications, radar, and positioning applications.

In spread spectrum systems using multiple spreading codes, it is not sufficient to employ codes with good autocorrelation properties since such systems may suffer from multiple-access interference (MAI) and possibly inter-symbol interference (ISI). In order to achieve good spreading characteristics in a multi code DS-CDMA system, it is necessary to employ sequences having good autocorrelation properties as well as low cross-correlations. The cross-correlation between any two codes should be low to reduce MAI and ISI.

Complementary codes, first introduced by Golay in M. Golay, "Complementary Series," IRE Transaction on Information Theory, Vol. 7, Issue 2, April 1961, are sets of complementary pairs of equally long, finite sequences of two kinds of elements which have the property that the number of pairs of like elements with any one given separation in one code is equal to the number of unlike elements with the same given separation in the other code. The complementary codes first discussed by Golay were pairs of binary complementary codes with elements +1 and −1 where the sum of their respective aperiodic autocorrelation sequence is zero everywhere, except for the center tap.

Polyphase complementary codes described in R. Sivaswamy, "Multiphase Complementary Codes," IEEE Transaction on Information Theory, Vol. 24, Issue 5, September 1978, are codes where each element is a complex number with unit magnitude.

An efficient Golay correlator-matched filter was introduced by S. Budisin, "Efficient Pulse Compressor for Golay Complementary Sequences," Electronic Letters, Vol. 27, Issue 3, January 1991, along with a recursive algorithm to generate these sequences as described in S. Budisin "New Complementary Pairs of Sequences," Electronic Letters, Vol. 26, Issue 13, June 1990, and in S. Budisin "New Multilevel Complementary Pairs of Sequences," Electronic Letters, Vol. 26, Issue 22, October 1990. The Golay complementary sequences described by Budisin are the most practical, they have lengths that are power of two, binary or complex, 2 levels or multi-levels, have good periodic and aperiodic auto-correlation functions and most importantly possess a highly efficient correlator-matched filter receiver.

However, Golay sequences are not without drawbacks. First, Golay sequences don't exist for every length, for example binary complementary Golay sequences are known for lengths $2^M$ as well as for some even lengths that can be expressed as sum of two squares. Second, an efficient Golay correlator-matched filter exists only for Golay sequences generated by Budisin's recursive algorithm and that are of length that is a power of two (i.e. $2^M$). Third, the Golay sequences generated using Budisin's recursive algorithm might not possess the desired correlation properties. Furthermore, good spreading sequences such as m-sequences, Gold sequences, Barker sequences and other known sequences do not possess a highly efficient correlator-matched/mismatched filter.

Therefore, there is a need in the art for a method of spread spectrum coding applied at the transmitter and an efficient method for de-spreading at the receiver.

SUMMARY

Certain aspects provide a method for wireless and wired communications. The method generally includes spreading at least one of the fields of a data stream with one or plurality of Golay sequences generated using a preferred Golay generator.

Certain aspects provide a method for wireless and wired communications. The method generally includes spreading at least one of the fields of a data stream with a Golay code or a generalized Golay code using a preferred Golay generator.

Certain aspects provide a method for wireless and wired communications. The method generally includes receiving a spread data stream wherein at least one of the fields is spread with one or plurality of spreading sequences, generating one a plurality of Golay and generalized Golay codes and despreading the spread fields of the data stream.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 3 illustrates an example transceiver that may be used within a wireless communication system in accordance with certain aspects of the present disclosure.

FIG. 4A illustrates an efficient Golay generator/correlator that may be used to generate a pair of Golay complementary codes or to perform matched filtering operations.

FIG. 4B illustrates an alternative efficient Golay generator/correlator that may be used to generate a pair of Golay complementary codes or to perform matched filtering operations.

FIG. 5A illustrates a preferred Golay generator in accordance with certain aspect of the present disclosure which may be used at a transmitter to generate one or multiple generalized Golay codes that may be used for spreading one or multiple fields of a data stream to be transmitted.

FIG. 5B illustrates one of the stages of the preferred binary Golay generator in accordance with certain aspect of the present disclosure.

FIG. 5C illustrates one of the stages of the preferred non-binary Golay generator in accordance with certain aspect of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope and spirit of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless and wired communication systems, including communication systems that are based on a single carrier transmission and OFDM. Aspects disclosed herein may be advantageous to systems employing Ultra Wide Band (UWB) signals including millimeter-wave signals, Code Division Multiple Access (CDMA) signals, and OFDM. However, the present disclosure is not intended to be limited to such systems, as other coded signals may benefit from similar advantages.

Figure 1:
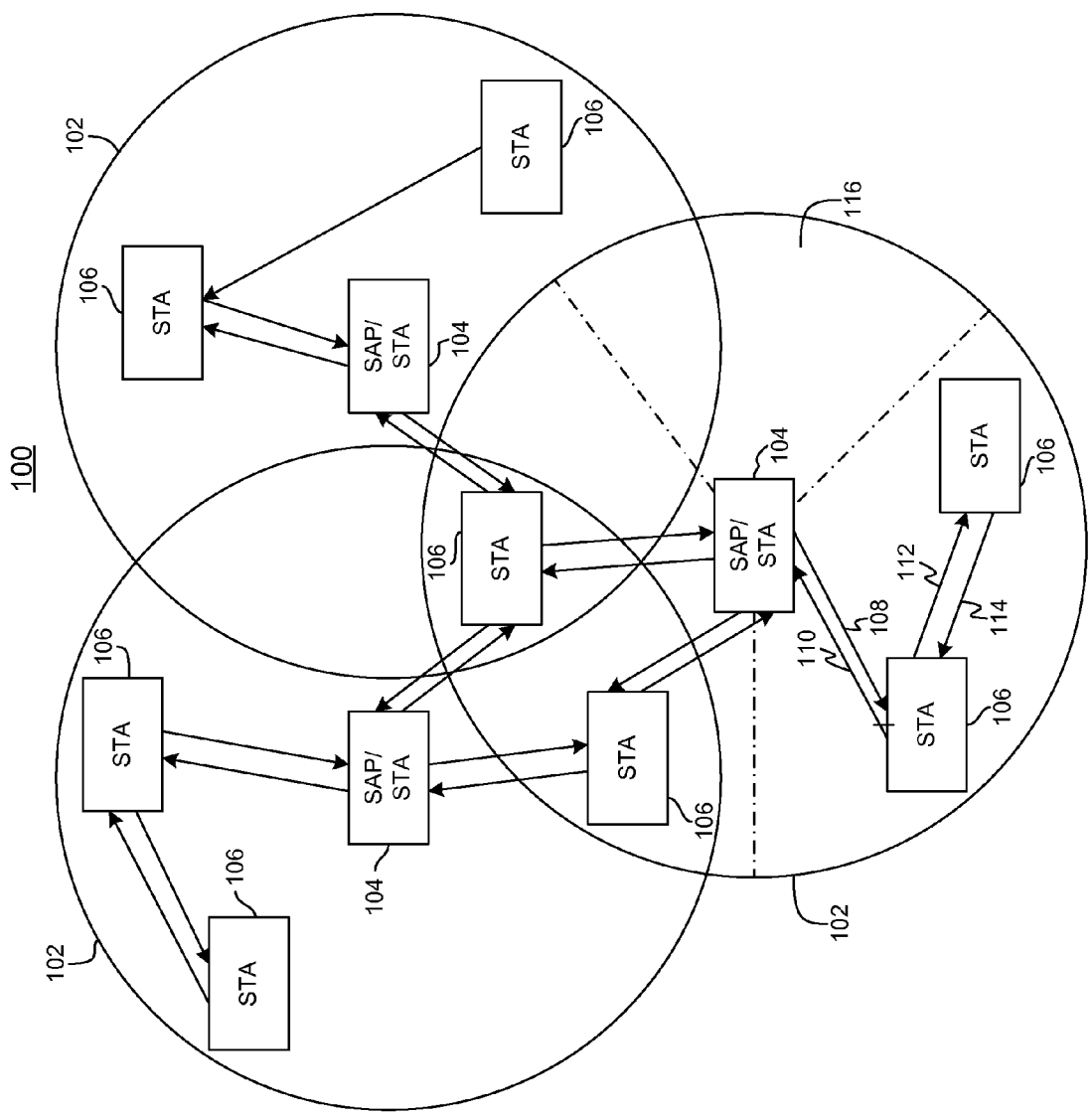
FIG. 1 illustrates an example wireless communication system, in accordance with certain aspects of the present disclosure.

FIG. 1 illustrates an example of a wireless communication system 100 in which aspects of the present disclosure may be employed. The wireless communication system 100 may be a broadband wireless communication system. The wireless communication system 100 may provide communication for a number of Basic Service Sets (BSSs) 102, each of which may be serviced by a Service Access Point (SAP) 104. A SAP 104 may be a fixed station or a mobile station that communicates with Stations (STAs) 106. A BSS 102 may alternatively be referred to as cell, piconet or some other terminology. A SAP 104 may alternatively be referred to as base station, a piconet controller, a Node B or some other terminology.

FIG. 1 depicts various stations 106 dispersed throughout the system 100. The stations 106 may be fixed (i.e., stationary) or mobile. The stations 106 may alternatively be referred to as remote stations, access terminals, terminals, subscriber units, mobile stations, devices, user equipment, etc. The stations 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the SAPs 104 and the STAs 106 and betweens STAs 106 themselves. For example, signals may be sent and received between the SAPs 104 and the STAs 106 in accordance with CDMA technique and signals may be sent and received between STAs 106 in according with OFDM technique. If this is the case, the wireless communication system 100 may be referred to as a hybrid CDMA/OFDM system.

A communication link that facilitates transmission from a SAP 104 to a STA 106 may be referred to as a downlink (DL) 108, and a communication link that facilitates transmission from a STA 106 to a SAP 104 may be referred to as an uplink (UL) 110. Alternatively, a downlink 108 may be referred to as a forward link or a forward channel, and an uplink 110 may be referred to as a reverse link or a reverse channel. When two STAs communicate directly with each other, a first STA will act as the master of the link, and the link from the first STA to the second STA will be referred to as downlink 112, and the link from the second STA to the first STA will be referred to as uplink 114.

A BSS 102 may be divided into multiple sectors 112. A sector 116 is a physical coverage area within a BSS 102. SAPs 104 within a wireless communication system 100 may utilize antennas that concentrate the flow of power within a particular sector 116 of the BSS 102. Such antennas may be referred to as directional antennas.

Figure 2:
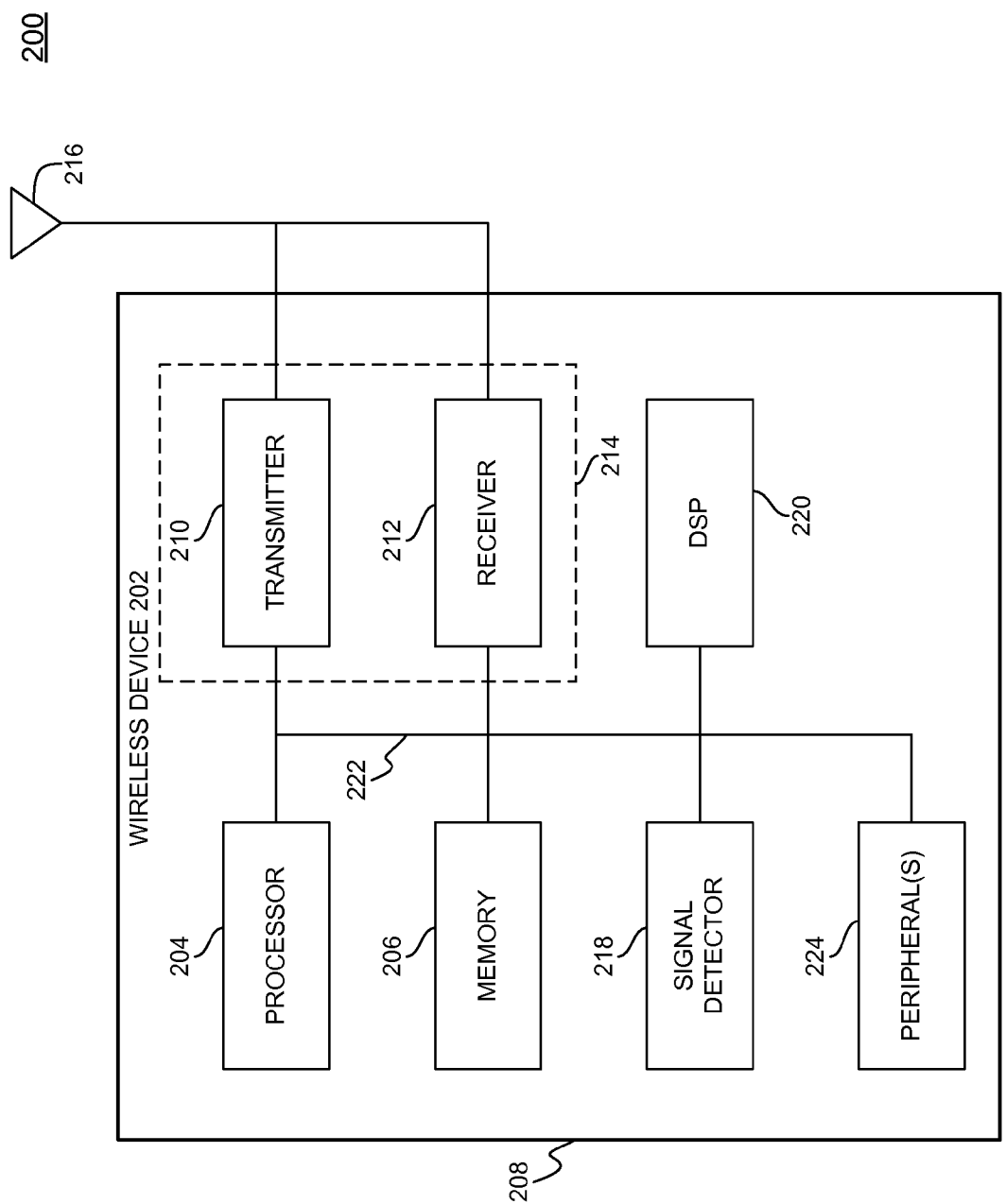
FIG. 2 illustrates various components that may be utilized in a wireless device in accordance with certain aspects of the present disclosure.

FIG. 2 illustrates various components that may be utilized in a wireless device 210 that may be employed within the wireless communication system 100. The wireless device 210 is an example of a device that may be configured to implement the various methods described herein. The wireless device 202 may be a SAP 104 or a STA 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may include one or more wired peripherals 224 such as USB, HDMI, or PCIE. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

FIG. 3 illustrates an example of a transmitter 302 that may be used within a wireless communication system 100 that utilizes CDMA or some other transmission technique. Portions of the transmitter 302 may be implemented in the transmitter 210 of a wireless device 202. The transmitter 302 may be implemented in a base station 104 for transmitting data 330 to a user terminal 106 on a downlink 108. The transmitter 302 may also be implemented in a station 106 for transmitting data 330 to a service access point 104 on an uplink 110.

Data 306 to be transmitted are shown being provided as input to a forward error correction (FEC) encoder 308. The FEC encoder encodes the data 306 by adding redundant bits. The FEC encoder may encode the data 306 using convolutional encoder, Reed Solomon encoder, Turbo encoder, low density parity check (LDPC) encoder, etc. The FEC encoder 308 outputs an encoded data stream 310. The encoded data stream 310 is input to the mapper 314. The mapper 314 may map the encoded data stream onto constellation points. The mapping may be done using some modulation constellation, such as binary phase-shift keying (BPSK), quadrature phase-shift keying (QPSK), 8 phase-shift keying (8PSK), quadrature amplitude modulation (QAM), constant phase modulation (CPM), etc. Thus, the mapper 312 may output a symbol stream 314, which may represents one input into a block builder 310. Another input in the block builder 310 may be comprised of one or multiple of spreading codes produced by a spreading-codes generator 318.

The block builder 310 may be configured for partitioning the symbol stream 314, into sub-blocks and creating OFDM/OFDMA symbols or single carrier sub-blocks. The block builder may append each sub-block by a guard interval, a cyclic prefix or a spreading sequence from the spreading codes generator 318. Furthermore, the sub-blocks may be spread by one or multiple spreading codes from the spreading codes generator 318.

The output 320 may be pre-pended by a preamble 322 generated from one or multiple spreading sequences from the spreading codes generator 324. The output stream 326 may then be converted to analog and up-converted to a desired transmit frequency band by a radio frequency (RF) front end 328 which may include a mixed signal and an analog section. An antenna 330 may then transmit the resulting signal 332.

FIG. 3 also illustrates an example of a receiver 304 that may be used within a wireless device 202 that utilizes CDMA or OFDM/OFDMA. Portions of the receiver 304 may be implemented in the receiver 212 of a wireless device 202. The receiver 304 may be implemented in a station 106 for receiving data 306 from a service access point 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be down-converted to a baseband signal by an RF front end 328' which may include a mixed signal and an analog portion. Preamble detection and synchronization component 322' may be used to establish timing, frequency and channel synchronization using one or multiple correlators that correlate with one or multiple spreading codes generated by the spreading code(s) generator 324'.

The output of the RF front end 326' is input to the block detection component 316' along with the synchronization information from 322'. When OFDM/OFDMA is used, the block detection block may perform cyclic prefix removal and fast Fourier transform (FFT). When single carrier transmission is used, the block detection block may perform despreading and equalization.

A demapper 312' may perform the inverse of the symbol mapping operation that was performed by the mapper 312 thereby outputting soft or hard decisions 310'. The soft or hard decisions 310' are input to the FEC decoder which provides an estimate data stream 306'. Ideally, this data stream 306' corresponds to the data 306 that was provided as input to the transmitter 302.

The wireless system 100 illustrated in FIG. 1 may be the UWB/millimeter wave system operating in the band including 57-64 GHz unlicensed band specified by the Federal Communications Commission (FCC).

Golay Codes

In one aspect of the disclosure, spreading codes generated by spreading code(s) generator 318 and 324 in a transmitter 302 are based on Golay codes. A summary of Golay codes, their properties, generation and reception is provided next.

A Golay complementary pair of codes of length $N=2^M$, denoted here a and b, are specified by a delay vector $D=[D_1, D_2, \ldots, D_M]$ with elements chosen as any permutation of $\{1, 2, 4, \ldots, 2^M\}$ and a seed vector $W=[W_1, W_2, \ldots, W_M]$. Binary Golay complementary sequences are generated when the seed vector elements $\{W_m\}$ are +1 or −1. Polyphase Golay complementary sequences are generated when the seed vector elements $\{W_m\}$ are arbitrary complex numbers with unit magnitude. Golay complementary pairs of length 1 are defined here as the pair of sequences $a=[+1]$ and $b=[+1]$. Alternative Golay complementary pairs of length 1 can be used such as $a=[+1]$ and $b=[-1]$.

The following MATLAB code can be used to generate a pair of binary or polyphase Golay complementary codes a and b of length $N=2^M$ with $M\geq 1$, using Budisin's recursive algorithm. The inputs to the MATLAB function being the delay vector D and seed vector W.

```
function [a,b] = GolayGeneratorI(D,W);
M=length(D);N=2^M;
a = [1 zeros(1,N−1)];b = a;
for m=1:M,
    I = mod([0:N−1]−D(m),N);
    an = +W(m)*a + b(I+(1));
    bn = −W(m)*a + b(I+(1));
    a = an; b = bn;
end;
return;
```

It should be appreciated that the Golay code generation describe above can be modified in many ways and still yields a pair of complementary Golay codes. The order of the adders and subtractors can be inverted, and the seed vector elements can multiply wither code a or b in the construction and still yields a pair of complementary Golay codes. To clarify the above, we provide one (out of many) alternative MATLAB Golay code generation, labeled "GolayGeneratorII".

```
function [a,b] = GolayGeneratorII(D,W);
M=length(D);N=2^M;
a = [1 zeros(1,N−1)];b = a;
for m=1:M,
    I = mod([0:N−1]−D(m),N);
    an = a + W(m)*b(I+(1));
    bn = a − W(m)*b(I+(1));
    a = an; b = bn;
end;
return;
```

A brief example of Golay complementary codes will now be provided. Consider Golay complementary codes of length 8 generated using the delay vector $D=[2,1,4]$ and seed vector $W=[+1,+1,−1]$. The MATLAB code "GolayGeneratorII" yields the following two Golay complementary codes $a=[+1,+1,+1,−1,−1,+1,−1,−1]$ $b=[+1,+1,+1,−1,+1,−1,+1,+1]$ The aperiodic autocorrelation function of sequences a and b, denoted here $R^a$ and $R^b$ respectively, are $R^a=[−1,−2,−1,0,+1,−2,+1,+8,+1,−2,+1,0,−1,−2,−1]$ $R^b=[+1,+2,+1,0,−1,+2,−1,+8,−1,+2,−1,0,+1,+2,+1]$ The sequences a and b are complementary in the sense that the sum, R, of their aperiodic autocorrelation functions, $R^a$ and $R^b$, is perfect in the sense that it has a main peak and no sidelobes $R=[0,0,0,0,0,0,0,16,0,0,0,0,0,0,0]$ Even though a pair of Golay codes is defined to be complementary in terms of their aperiodic autocorrelation functions, they have excellent periodic properties as well. The periodic autocorrelation functions $C^a$ and $C^b$ of the pair of above sequences a and b, are $C^a=[+8,0,−4,0,0,0,−4,0]$ $C^b=[+8,0,+4,0,0,0,+4,0]$ And the sum, C, of their periodic autocorrelation functions is again perfect, i.e. a main of peak of strength $2N=16$ and no sidelobes $C=[8,0,0,0,0,0,0,0]$ When used individually, we are interested in the correlation properties of either sequence a or sequence b of the Golay complementary pair. In the example above, the magnitude of the highest sidelobe-level of the aperiodic function of either code is 2 and the magnitude of the highest sidelobe-level of the periodic function of either code is 4. So when analyzed individually these codes may not be the best codes to be used as spreading codes.

FIG. 4A shows a circuit that can be configured as an efficient Golay generator that may be used to generate a pair of Golay complementary sequences that may be part of a transmitter 210 within a wireless device 202. Alternatively, the circuit in FIG. 4A may be configured as an efficient Golay correlator (or matched filter) to be used in a receiver 212 within a wireless device 202.

When configured an efficient Golay generator, the input 402 is a Kronecker delta sequence δ(n) which has the value one at lag 0 (i.e. at n=0) and zero everywhere else. When configured as an efficient Golay correlator, the input 402 may be a quantized received signal x(n).

The Golay code generator/correlator of FIG. 4A comprises a sequence of delay components 404-1 to 404-M configured for providing a set of fixed delays as specified by the elements of the delay vector D, a sequence of multipliers 406-1 to 406-M which multiply their input by the elements of the seed vector W, a sequence of subtractors 408-1 to 408-M and a sequence of adders 410-1 to 410-M. The Golay code generator/correlator is modular and comprises M stages, where the stage m, 416-m, with m=1, 2, . . . , M, comprises a delay component 404-m, a multiplier by a seed element 406-m, a subtractor 408-m, and an adder 410-m. The delay component 404-m comprises $D_m$ delay elements where each delay element may comprise R basic memory cells such as Flip-Flops, where R is the number of bits used to represent the inputs to the stage m, i.e. the outputs 412-(m−1) and 414-(m−1) of the previous stage. The stage-m outputs 412-m and 414-m are input to the next stage, i.e. stage m+1. When the circuit 400 operates as an efficient Golay generator, the outputs 412-M and 414-M of the last stage are the Golay complementary sequences $b_n$ and $a_n$ with n=0, 1, . . . , N−1. When the circuit 400 is configured as an efficient Golay correlator (matched filter), the outputs 412-M and 414-M of the last stage are the convolution between the input x(n) and the reverse and conjugate of the Golay complementary sequences, i.e. the circuit performs matched filter operations, and the outputs 412-M and 414-M are $x_n \otimes b^*_{-n}$ and $x_n \otimes a^*_{-n}$ repsectively.

In stage m, 416-m, the position of multiplier 406-m, adder 410-m, and subtractor 408-m can be exchanged while still being a Golay code generator/correlator. To clarify the above, an alternative Golay code generator/correlator is provided in FIG. 4B. The input 452 is configured as above, i.e. when the circuit is configured as an efficient Golay generator, the input is the Kronecker delta sequence δ(n), and when the circuit is configured as n efficient Golay correlator, the input may be a quantized received signal x(n). The Golay code generator/correlator comprises a set of delay components 454-1 to 454-M set according to the delay vector D, a set of multipliers 456-1 to 456-M where each multiplier multiplies its input with the corresponding element from the seed vector W, a set of subtractors 458-1 to 458-M, and finally a set of adders 460-1 to 460-M.

The Golay codes provided above have multiple drawbacks. The efficient Golay generator for a code length $2^M$ is of high complexity as compared for example to a maximal-length sequence (m-sequence) generator for m-sequences of length $2^M-1$. The latter uses a linear feedback shift register (LFSR) with M binary memory elements only. The second drawback is that Golay complementary codes do not exist for every length, for example there are no Golay codes of odd length. Finally, Golay complementary codes have perfect correlation properties when used together in specific ways, but when used individually, these codes are not necessarily optimal.

Preferred Golay Generator

In one aspect of the present disclosure, Golay codes may be used as spreading codes and the spreading-code(s) generator 318 and/or the spreading code(s) generator 324 in transmitter 302 may be configured to generate Golay codes using a preferred Golay code generator.

FIG. 5A shows a preferred binary Golay generator 500 according to one aspect of the disclosure. The circuit 500 generates a pair of Golay complementary sequence $b_n$ and $a_n$ with n=0, 1, . . . , N−1, where $N=2^M$. The delay vector D in this configuration is set to $D=[2^{M-1}, 2^{M-2}, \ldots, 2^0]$ and the seed vector $W=[W_1, W_2, \ldots, W_m]$ has elements $\{W_m\}$ which are logic 0 or 1. The circuit 500 comprises M stages. The first stage inputs 512-1 and 514-1 are tied to input 502 set to a Kronecker delta sequence δ(n) which has the value one at lat 0 (i.e. at n=0) during the first clock cycle of master clock CLK and zero everywhere else. Stage m with m=1, 2, . . . , M has five inputs and two outputs. The first two inputs 512-m and 514-m are the outputs of the previous stage, i.e. stage m−1. The third input 516-m is the $m^{th}$ bit of a count-down counter 508 driven by a clock signal 506 labeled CLK. The fourth input is the seed element $W_m$, and the fifth input 518-m is a signal that takes on the values 0 and 1 and is generated by the control unit 512.

The counter 508 is initialized to N−1 and decrements by 1 for each clock cycle of signal CLK. The most significant bit of the counter (i.e. bit of weight $2^{N-1}$) is signal 516-1 and the least significant bit of the counter (i.e. bit of weight $2^0$) is signal 516-M. The counter acts as a clock divider, and the signal 516-m is actually a clock signal with frequency equal to the main signal CLK divided by $2^{M+1-m}$, i.e. $CLK/2^{M+1-m}$. In another aspect of the disclosure, signal 516-m is used as an enable signal that enables input 512-m to be input to stage m block 504-m.

The M bits out of the counter 508 are inverted before being input to the control unit 512 with inverters 510-1 to 510-M. The inverted input is equivalent to a counter initialized to zero and counting up by 1 for each clock cycle of signal CLK. The control unit 512 generates M control signals 518-1 to 518-M. The first control signal 518-1 is 1 when the input to the control unit (i.e. the up counter) is equal to N/2 and zero otherwise. The $m^{th}$ control signal 518-m is 1 when the input to the control unit is in the following set of $2^{m-1}$ integers $\{D_m, D_m+2^{M+1-m}, D_m+2^{M+2-m}, \ldots, D_m+2^M-2M+1-m$ and zero otherwise. The $M^{th}$ control signal 518-M is 1 when the input to the control unit is in the following set of $N/2=2^{M-1}$ integers $\{1, 3, 5, \ldots N-1\}$ and zero otherwise.

FIG. 5B shows. an example implementation of the stage-m in circuit 500 according to one aspect of the disclosure. The inputs 542, 544, 546 and 550 correspond to inputs 512-m, 514-m, 516-m, and 518-m to stage m in circuit 500. The input 548 is seed element $W_m$. The circuit 540 comprises a basic memory storage element (such as a Flip-Flop) 556 driven by input 542. The output of the 556 is XORed in logic XOR gate 548 with signal 558 i.e. with the seed element $W_m$. The circuit 540 comprises as well a logic INVERTER 560, two AND gates 562 and 568, and two XOR gates 564 and 566. The outputs 552 and 554 correspond to outputs 515-m and 517-m in stage m of circuit 500. The outputs 552 and 554 are equal to the input 544 when the signal 550 is set to zero, i.e. the input passes through to the two outputs. When signal 550 is set to one, input 544 should be zero and the output 554 is equal to the output of XOR gate 558 while output 552 is the inverse of output 554.

The preferred Golay generator in FIG. 5A where each stage may be implemented as shown in FIG. 5B has a very low complexity as compared to the efficient Golay generator shown in FIG. 4A or FIG. 4B. The outputs of the preferred Golay generator are logic 0 and 1 which when mapped to binary levels −1 and +1 yields equivalent output to the efficient Golay generator in FIG. 4B. In order to compare the two architectures, consider for example the generation of a binary Golay code of length 128, i.e. M=7, and N=128, with delay vector $D=[2^{M-1}, 2^{M-2}, \ldots, 2^0]$ and an arbitrary binary seed vector $W=[W_1, W_2, \ldots, W_M]$. The elements $\{W_m\}$ are set to logic 0 or logic 1 in FIG. 5A whereas they are set to +1 or −1 in FIG. 4A and FIG. 4B. Each stage in the preferred Golay generator comprises a single basic memory storage element such as a Flip-Flop, and therefore there the preferred Golay generator comprises M basic memory storage elements and some logic gates, a counter and a control unit driven by a counter. The efficient Golay generator comprises 2(N−1)=254 basic memory storage elements, 2M multiplexers to implement multiplication by the elements of the seed vector W, 2M adders and 2M subtractors where each of the adders and subtractors has 2 inputs with each input being represented with 2 bits (to represent +1, 0, and −1) and 2 bits output. The m-th stage in FIG. 4A or FIG. 4B has $2^m$ memory elements where each memory element comprises two basic memory storage elements such as Flip-Flops. Therefore the total number of basic storage elements is 2 ($2^6+2^5+ \ldots +2$0)=254 as indicated above.

In another aspect of the disclosure, in the preferred efficient Golay generator in FIG. 5A, the stage m implementation shown in FIG. 5B can be configured in many different ways while still yielding a pair of binary complementary Golay codes. For example, the XOR gate 558 in FIG. 5B can be moved to the lower branch, i.e. the lower input of the XOR gate can be excited by signal 544 instead of being excited with the basic memory storage element output. In addition, the XOR gate 558 can be placed at the lower input to the AND gate 568. Furthermore, the XOR gate 558 and the INVERTER 560 can be moved simultaneously as described above.

In another aspect of the disclosure, the stages 1 to M in the preferred efficient Golay generator in FIG. 5A can be configured to operate with any arbitrary non-binary (possibly complex) seed vector W. Consider the generation of multilevel complex Golay complementary sequences where the real and imaginary can be represented with R-bits integers. FIG. 5C shows an implementation of the stage m, where m=1, 2..., M, according to one aspect of the disclosure. The inputs 572, and 574 are the outputs of the previous stage, i.e. stage m−1, and each can be represented as two R-bits integers, one R-bits integer for the real part and one R-bits integer for the imaginary part. The memory component 586 is clocked with signal 576 corresponding to the $m^{th}$ bit 516-m in FIG. 5A. The memory component 586 comprises 2R basic memory storage elements such as flip-flops (i.e. 2R flip-flops), R basic memory storage elements to store the real part and R basic memory storage elements to store the imaginary part. The complex output of the memory component 586 is multiplied using a complex multiplier 588 with input 578, where input 578 is the $m^{th}$ see element $W_m$. The output of multiplier 588 is being gated through multiplier 590 with control signal 580 corresponding to the $n^{th}$ control signal 518-m in FIG. 5A. By gating we mean that when control signal 580 is one, the output of multiplier 590 passes through to subtractor 592 and to adder 594, and when control signal 580 is zero, the output of multiplier 590 is being blocked, i.e. set to zero. The output of multiplier 590, i.e., the gated signal, and signal 574 are input to subtractor 592 and adder 594 to yield outputs 582 and 584, where each output is composed of an R-bit integer for the real part and R-bit integer for the imaginary part.

According to another aspect of the present disclosure, the stage m circuit in FIG. 5C can be manipulated in many ways while still yielding a pair of Golay complementary sequences when used in the preferred Golay generator shown in FIG. 5A. As an example, multiplier 588 can be moved to the lower branch, i.e. connected to input 574 rather than to the output of the memory component 586. Multiplier 590 can be moved to lower branch along with multiplier 588. Subtractor 592 and adder 594 can be exchanged, and so on.

According to another aspect of the disclosure, the stages 1 to M in the preferred efficient Golay generator in FIG. 5A can be configured to operate with arbitrary delay vector D and any arbitrary non-binary (possibly complex) seed vector W. The stage m memory component 586 in FIG. 5C, changes its state $2^{m-1}$ times, i.e. stores its input at clock cycles $\{0, 2^{M+1-m}, 2^{M+2-m}, \ldots, 2^{M+1}-2^{M+1-m}\}$ of master clock CLK 506 in FIG. 5A. Gating signal 580 in FIG. 5C is high $2^{m-1}$ times at clock cycles $\{D_m, D_m+2^{M+1-m}, D_m+2^{M+2-m}, \ldots, D_m+2^M2-2^{M+1-m}\}$ of master CLK 506 in FIG. 5A. If $D_m$ is less than $2^{M+1-m}$, i.e. if the first stored input (stored at clock cycle 0) in the memory component is being consumed (at clock cycle $D_m$) before the memory component stores its second input (at clock cycle $2^{M+1-m}$), than stage-m in FIG. B for the binary case, and stage-m in FIG. 5C for the general case need not to be changed. If on the other hand $D_m$ is bigger than $2^{M+1-m}$ but less than $2^{M+2-m}$, then in order for the second input not to overwrite the first input before being consumed, the memory component 556 in FIG. 5B and the memory component 586 in FIG. 5C should contain two memory elements instead of one in one aspect of the disclosure. The remainder of the circuits in FIG. 5B and FIG. 5C remain unchanged. For example memory component 556 in FIG. 5B may be implemented as a shift register of two Flip-Flops to accommodate the above described matter. Therefore, in one aspect of the disclosure, the memory component 556 in FIG. 5B and the memory component 586 in FIG. 5C should contain L memory elements instead of one where L is the index satisfying the following constraint $2^{M+L-1-m} \leq D_m \leq 2^{M+L-m}$. According to the aspect of the disclosure, memory element 556 in FIG. 5B would comprise L basic memory storage element (which can be implemented for example as a shift register of L flip-flops) and memory element 586 in FIG. 5C, would comprise 2R basic memory storage elements (2R flip-flops for example), R basic memory storage elements for the real part and R basic memory storage elements for the imaginary part.

Spreading of Transmission Signal

In another aspect of the present disclosure, the spreading-code(s) generator 518 and/or the spreading code(s) generator 524 may be configured to generate generalized-Golay spreading codes.

Figure 6A:
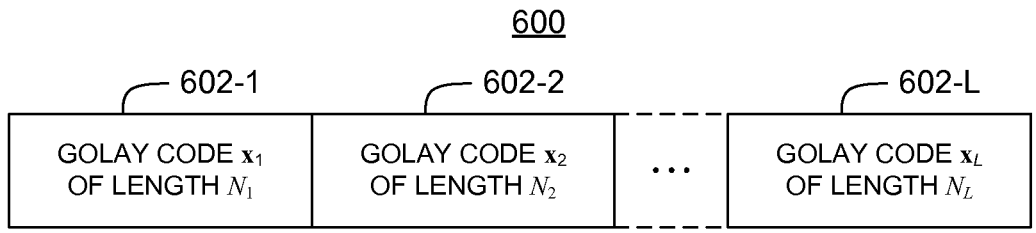
FIG. 6A illustrates a generalized Golay code in accordance to one aspect of the present disclosure which may be used at a transmitter to generate one or multiple generalized Golay codes that may be used for spreading one or multiple fields of a data stream to be transmitted.

A generalized-Golay spreading code is a code that has a Golay decomptisition, i.e. a code formed by concatenating a plurality, of Golay codes as shown in FIG. 6A. The Golay codes used to form a generalized-Golay code can be of type "a" or "b", i.e. either one of the complementary pair of Golay codes can be used, and can be of different lengths. As shown in FIG. 6A, a Generalizetl-Golay code of length N= $N_1+N_2+\ldots+N_1$, is formed by concatenating a first Golay code 602-1 labeled $x_1$, of type "a" Or "b" and of length $N_1$, to a second code Golay code 602-2, labeled $x_2$, of type "a" or "b" and of length $N_2$, and so on. The number of Golay codes, L, is such that $L \geq 2$. Unlike Golay codes, generalized-Golay codes can be of any length, i.e. even, odd, prime, power of two, etc.

In the following, an example of generalized-Golay code according to one aspect of the disclosure is provided. There are no Golay complementary sequences of length 24. In accordance to one aspect of the disclosure, a generalized-Golay sequence of length 24 can be generated by appending a Golay code of length 8 to a Golay code to a length 16. The Golay components should be chosen properly as for the generalized-Golay code to have good correlation properties. A construction example is as follows. First, a pair of Golay complementary codes $a_1$ or sequence $b_1$ of length 16 can be generated using delay vector D=[4,8,1,2] and seed vector W=[+1,+1,+1,+1]:

$a_1$=[+1,+1,+1,−1,+1,+1,+1,−1,+1,−1,+1,+1,−1, +1,−1,−1]

$b_1$=[+1,+1,−1,+1,+1,+1,−1,+1,+1,−1,−1,−1,−1, +1,+1,+1]

Second, a pair of Golay complementary codes $a_2$ and $b_2$ of length 8 can be generated using delay vector D=[4,2,1] and seed vector W=[+1,+1,+1]:

$a_2$=[+1,+1,+1,−1,+1,+1,−1,+1]

$b_2$=[+1,−1,+1,+1,+1,−1,−1,−1]

Finally, a generalized-Golay code c of length 24 is formed as follows $c$=[$a_2 b_1$]=[+1,+1,+1,−1,+1,+1,+1,−1,+1,−1,+1,+1,
  −1,+1,−1,−1+1,−1,+1,+1,+1,−1,−1,−1]

The generalized-Golay sequence c has good correlation properties. The maximum sidelobe-level magnitude of the aperiodic and periodic autocorrelation functions is 4 compared to a peak of magnitude 24 which makes it a good spreading code. The generalized code d=[$b_2 a_1$] (constructed from the sequences $b_2$ and $a_1$ complementary to the sequences $a_2$ and $b_1$ used to form c) is not complementary to c; the sum of their aperiodic autocorrelations have very few sidelobes and therefore it is pseudo-complementary.

A second example of a generalized-Golay code according to one aspect of the disclosure is provided next. A generalized code C of length 19 is generated by concatenating three short codes. The first constituent Golay code $a_1$=[1] is of type "a" and length 1, the second constituent Golay code $a_2$=[+1,+1] is of type "a" and length 2 generated using $D_2$=[1] and $W_2$=[+1], and the third constituent Golay code $b_3$=[+1,−1,−1,+1,−1,−1,+1,+1,−1,−1,−1,−1,+1,−1,+1,−1] is of type "b" and length 16 generated using $D_3$=[4,1,8,2] and $W_3$=[−1,−1,−1,+1]. The resulting generalized code c is shown below $c$=[+1,+1,+1,+1,−1,−1,+1,−1,−1,+1,+1,−1,−1,−1,
  −1,+1,−1,+1,−1]

This length 19 sequence has a periodic autocorrelation function with maximum sidelobe-level magnitude of 1 as compared to the main peak of 19 and has similar properties to maximal length sequences also known as m-sequences.

Figure 6B:
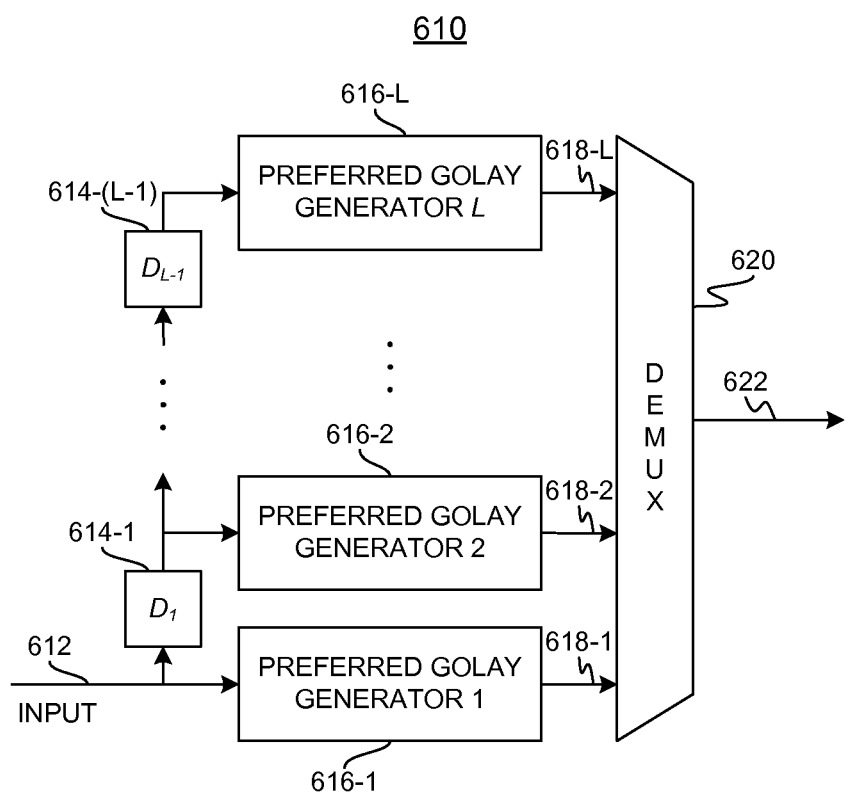
FIG. 6B illustrates a preferred generalized Golay generator in accordance to one aspect of the present disclosure which may be used at a transmitter to generate one or multiple generalized Golay codes that may be used for spreading one or multiple fields of a data stream to be transmitted.

In one aspect of the disclosure, the generalized Golay codes can be generated by concatenating the outputs of a plurality of preferred Golay generators as shown in FIG. 6B. This shall be referred to as preferred Generalized Golay generator. The generalized-Golay code in FIG. 6B is of length $N=N_1+N_2+\ldots+N_L$ and can be written as $x(n)=x_1(n)+x_2(n-N_1)+\ldots+x_L(n-N_1-N_2-\ldots-N_{L-1})$ And therefore can be implemented as shown in FIG. 6B. The input 612 is a Kronecker delta sequence δ(n) which has the value one at lag 0 (i.e. at n=0) and zero everywhere else. The input 612 is being delayed through delays 614-1 to 614-(L−1) before exciting the preferred Golay generators 618-1 to 618-(L−1). The first delay component 614-1 may be implemented as $N_1$ basic memory storage elements (such as $N_1$ flip-flops), and the (L−1)$^{th}$ delay element 614-(L−1) may be implemented as $N_{L-1}$ basic memory storage elements (such as $N_1$ flip-flops). The output 618-1 of preferred Golay generator 616-1 is the first Golay code $x_1(n)$, the output 618-2 of preferred Golay generator 616-2 is the second Golay code in the Golay decomposition, i.e. $x_2(n-N_1)$ delayed by $N_1$ elements, and the output 618-L of preferred Golay generator 616-L is the L$^{th}$ Golay code in the Golay decomposition, i.e. $x_L(n-N_1-N_2-\ldots-N_{L-1})$ delayed by $N_1+N_2+\ldots+N_{L-1}$. The outputs 618-1 to 619-L are demultiplexed through demultiplexer 620 to yield the desired generalized Golay code at output 622. In one aspect of the disclosure, the memory components in the first stages of preferred Golay generators 616-1 to 616-L may be shared in order to reduce hardware complexity. As an example of preferred generalized Golay code generation, the length 24 generalized complementary code described above can be generated using two preferred Golay generators, a first preferred binary Golay generator 616-1 as shown in FIG. 5B configured for a delay vector D=[4,8,1,2] and seed vector W=[1,1,1,1] and a second preferred binary Golay generator 616-2 as shown in FIG. 5B configured for a delay vector D=[4,2,1] and seed vector W=[1,1,1].

Exemplary Millimeter Wave System

In accordance to one aspect of the disclosure, a generalized-Golay code is used as a spreading sequence in a millimeter-wave system operating in the 57-64 GHz frequency band as detailed below.

Figure 7:
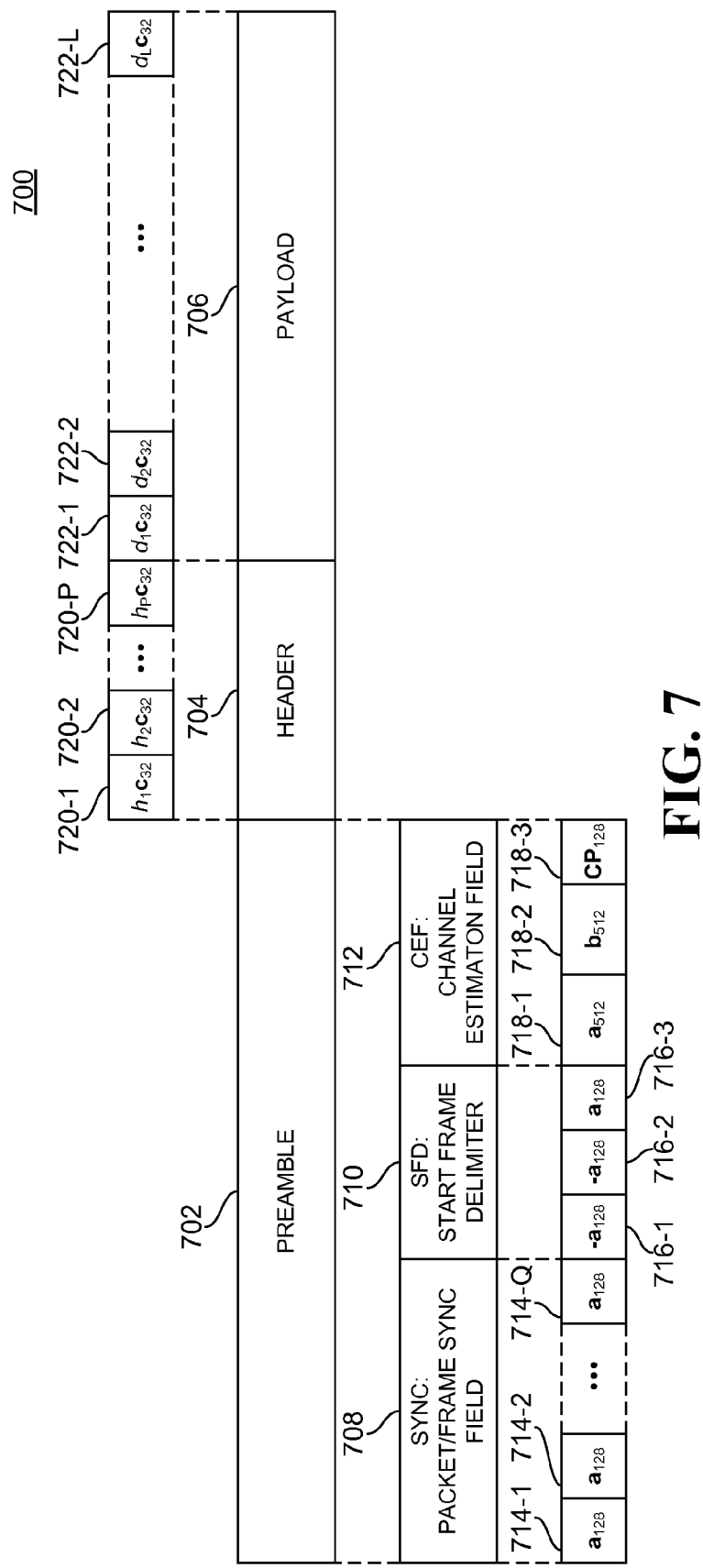
FIG. 7 a millimeter wave frame format using Golay and Generalized Golay codes in accordance to one aspect of the present disclosure.

FIG. 7 illustrates a millimeter wave frame structure that may be employed by an aspect of the invention. The frame structure is for a control channel that may be used in wireless communication system 100 in FIG. 1 for beaconing transmission from a service access point 104, association between a station 106 and the service access point 104, medium access layer (MAC) command frames and responses between station 106 and the service access point 104, and peer to peer control channel between two stations, etc. A frame (or packet) comprises a preamble 702, header 704, and packet payload 708. The preamble may comprise a packet sync sequence field 708, a start-frame delimiter field 710, and a channel-estimation sequence field 712. The frame delimiter field 710 and the channel-estimation sequence filed 712 may be combined into a single channel-estimation sequence filed. The sync sequence 211 is a repetition of ones spread by Golay codes $a_{128}$ and/or $b_{128}$ (i.e. one of two Golay complementary codes of length 128 or both). The start-frame delimiter field 212 comprises a sequence {1 −1 1 −1 . . . } spread by $a_{128}$ and/or $b_{128}$ to indicate the end of the sync field. The channel-estimation field 712 may be spread using $a_{512}$ and/or $b_{512}$. The header and data fields 202 and 203 may be binary or complex-valued, and spread using generalized Golay code $c_{32}$ according to one aspect of the disclosure.

Golay codes of length $N=2^M$ where M is odd, such as N=32, do exist, however they do not have good correlation properties to be used used as spreading codes for the header 704 and payload 706. When used as spreading codes, we are interested in the maxim and/or root-mean-square (r.m.s) sidelobe level of the aperiodic autocorrelation function of the code. The best Golay code length $N=2^M$ where M is odd, has a maximum sidelobe level of $2^{(M+1)/2}$, the main peak being N. For example, the best Golay code of length 32 has a maximum sidelobe level of 8.

In one aspect of the disclosure, a generalized Golay code of length $N=2^M$ where M is odd, such as N=32, is used as a spreading code for the header 704 and/or data 706 instead of a Golay code. Generalized Golay codes of length $N=2^M$ where M is odd have better periodic and aperiodic correlation properties when compared to Golay codes of the same length. In the following an example of a generalized Golay code of length N=32 is provided. First, a pair of Golay complementary codes $a_1$ or sequence $b_1$ of length 16 is generated using delay vector D=[8,2,4,1] and seed vector W=[+1,+1,+1,+1] in MATLAB code "GolayGenerator1":

$$a_1=[+1,+1,+1,+1,+1,-1,-1,+1,+1,+1,-1,-1,+1,\\-1,+1,-1]$$

$$b_1=[+1,-1,+1,-1,+1,+1,-1,-1,+1,-1,-1,+1,+1,\\+1,+1,+1]$$

Second, a pair of Golay complementary codes $a_2$ and $b_2$ of length 16 is generated using delay vector D=[8,1,4,2] and seed vector W=[+1,+1,+1,-1]:

$$a_2=[-1,+1,-1,+1,+1,+1,-1,-1,-1,-1,-1,-1,+1,\\-1,-1,+1]$$

$$b_2=[+1,-1,-1,+1,-1,-1,-1,+1,+1,-1,-1,-1,\\+1,-1,+1]$$

Finally, a generalized-Golay code c of length 32 is formed as follows $$c=[b_1b_2]=[+1,-1,+1,-1,+1,+1,-1,-1,+1,-1,-1,\\+1,+1,+1,+1,+1,+1,-1,-1,+1,-1,-1,-1,-1,\\+1,+1,-1,-1,-1,+1,-1,+1]$$

The constructed generalized Golay code c of length 32 has a maximum sidelobe level of 4 for its periodic autocorrelation function, a sidelobe level of 5 for its aperiodic autocorrelation function. Furthermore, this code has a maximum sidelobe level of 6 when modulation and interference from adjacent symbols is taken into accounts. To elaborate on this last point, two adjacent symbols after spreading by a code $c_{32}$ of length 32 chips will take one of four possibilities [+$c_{32}$, +$c_{32}$], [+$c_{32}$, −$c_{32}$], [−$c_{32}$, +$c_{32}$], and [−$c_{32}$, −$c_{32}$] corresponding to the four cases of the two symbols being [+1+1], [+1,−1], [−1,+1], and [−1,−1]. In this case we are interested in the sidelobe level after reception and correlation using a matched filtering, i.e. convolution with $c_{32}$ (−n), and is described above, the constructed generalized Golay code has a maximum sidelobe level of 6 when modulation and interference from adjacent symbols is taken into accounts.

According to one aspect of the disclosure, a generalized Golay code of length N=$2^M$ where M is odd, having a maximum sidelobe level of $2^{(M-1)/2}$ for its aperiodic autocorrelation function may be used as a spreading code of header 704 and/or payload 706. This is to be compared to the maximum sidelobe level of $2^{(M+1)/2}$ for the aperiodic autocorrelation function of the best Golay codes. As an example, a first Golay code $a_1$=[+1,+1,+1,-1,+1,+1,-1,+1,+1,+1,+1,-1,-1,-1,+1,-1] of type "a", length 16 constructed using a delay vector D=[8,4,2,1] and seed vector W=[+1,+1,+1,+1] is concatenated with a second Golay code $b_2$=[+1,-1,-1,-1,+1,+1,-1,+1,-1,+1,-1,-1,-1,-1,+1] of type "b", length 16 constructed using a delay vector D=[8,2,1,4] and seed vector W=[−1,+1,+1,+1] to obtain a generalized Golay code of length 32

$$c=[a_1b_2]=[+1,+1,+1,-1,+1,+1,-1,+1,+1,+1,+1,-1,\\-1,-1,+1,-1,+1,-,-1,-1,+,+1,-1,+1,-1,+1,\\-1,-1,-1,-1,+1,-1]$$

The constructed generalized Golay code has a maximum sidelobe level of 4 for its aperiodic autocorrelation function. This is to be compared with a sidelobe level of 8 for the best Golay codes of the same length.

In another aspect of the disclosure, generalized Golay codes of length N=$2^M$ where M is odd, having a maximum sidelobe level of $2^{(M-1)/2}$ for its periodic autocorrelation function may be used for the sync field 708. This is to be compared to the maximum sidelobe level of $2^{(M+1)/2}$ for Golay codes. For example, a generalized Golay code of length 128 may be constructed by concatenating a first Golay code of length 64 of type "a" or "b" to a Golay code of length 64 of type "a" or "b". The resulting generalized Golay code of length 128 may be selected by construction to have a maximum sidelobe level of 8 and may be used for the sync filed 708.

In FIG. 7, the header 704 is spread using one bit per symbol. If the header consists of P symbols [$h_1, h_2, \ldots, h_P$] where each symbol consists of a single bit, than the spread header consists of fields 720-1 to 720 P, i.e. [$h_1c_{32}, h_2c_{32}, \ldots, h_Pc_{32}$], and therefore for example, the modulated (or spread) first bit is $c_{32}$, if bit $h_1$ is +1, the modulated (or spread) first bit is −$c_{32}$, if bit $h_1$ is +1 and so on. The same explanation applies to payload 706.

In another aspect of the disclosure, a data stream may be modulated using a plurality of generalized Golay codes to send multiple bits per spread symbol. The modulation may be achieved using a combined spreading and binary complex or multilevel constellation. As an example, header 704 can use two generalized Golay codes of length N to send two bits per spread symbol, i.e. we can send bits $h_1$ and $h_2$ in the first spread symbol, bits $h_3$ and $h_4$ in the second spread symbol, and so on, where each spread symbol is of length N. This is best illustrated with the following example. Consider a pair of generalized Golay codes of length N=32, labeled here as $c_{32}$ and $d_{32}$. The $m^{th}$ spread symbol (m=1, 2, ..., P/2), labeled $s_m$, that is used to send bits $h_{2m-1}$ and $h_{2m}$) will be encoded as follows, $$h_{2m-1}=+1, h_{2m+1}=+1 \text{ than } s_m=+c_{32}$$

$$h_{2m-1}=+1, h_{2m+1}=-1 \text{ than } s_m=-c_{32}$$

$$h_{2m-1}=-1, h_{2m+1}=+1 \text{ than } s_m=+d_{32}$$

$$h_{2m-1}=-1, h_{2m+1}=-1 \text{ than } s_m=-d_{32}$$

In another aspect of the disclosure, a data stream may be modulated using a pair of pseudo complementary generalized Golay codes to send two bits per spread symbol. A pair of generalized Golay codes is pseudo complementary if the constituents Golay codes used to construct the first generalized Golay code are the complementary of the constituents Golay codes used to construct the second generalized Golay code. As an example, consider two pairs of complementary Golay codes, a first pair $a_{1,16}$ and $b_{1,32}$, and a second pair $a_{2,16}$ and $b_{2,16}$. We can construct two pseudo-complementary generalized Golay codes of length 32, labeled here as $c_{32}$ and $d_{32}$, as follows $$c_{32}=[a_{1,16}, b_{2,16}]$$

$$d_{32}=[b_{1,16}, a_{2,16}]$$

As another example, the following pair $c_{32}=[a_{1,16}, -a_{2,16}]$ and $d_{32}=[b_{1,16}, -b_{2,16}]$ is also a pair of pseudo-complementary generalized Golay codes. In another aspect of the disclosure, a data stream may be modulated using multiple pairs of pseudo complementary generalized Golay codes to send multiple bits per spread symbol.

In another aspect of the disclosure a data stream may be modulated using a plurality of generalized Golay codes to send multiple bits per spread symbol using one of phase shift keying and quadrature amplitude modulation. As an example, a data stream can be divided into blocks of bits, each comprising a set of three consecutive bits, and wherein two of the three bits are used to select a point from a QPSK constellation (i.e. +1, or −1, or +j, or −j) using Gray mapping and the remainder bit is used to select one of two pseudo complementary generalized Golay codes c and d. The following is an example of the mapping between the $m^{th}$ group of bits, $d_{3m-2}d_{3m-1}d_{3m}$, and the spread symbol $s_m$ of the modulated data stream $$d_{3m-2}d_{3m-1}d_{3m}=000 \text{ than } s_m=+c$$

$$d_{3m-2}d_{3m-1}d_{3m}=001 \text{ than } s_m=+d$$

$$d_{3m-2}d_{3m-1}d_{3m}=010 \text{ than } s_m=+jc$$

$$d_{3m-2}d_{3m-1}d_{3m}=011 \text{ than } s_m=+jd$$

$$d_{3m-2}d_{3m-1}d_{3m}=100 \text{ than } s_m=+jc$$

$$d_{3m-2}d_{3m-1}d_{3m}=101 \text{ than } s_m=+jd$$

$$d_{3m-2}d_{3m-1}d_{3m}=110 \text{ than } s_m=-c$$

$$d_{3m-2}d_{3m-1}d_{3m}=111 \text{ than } s_m=-d$$

Figure 10A:
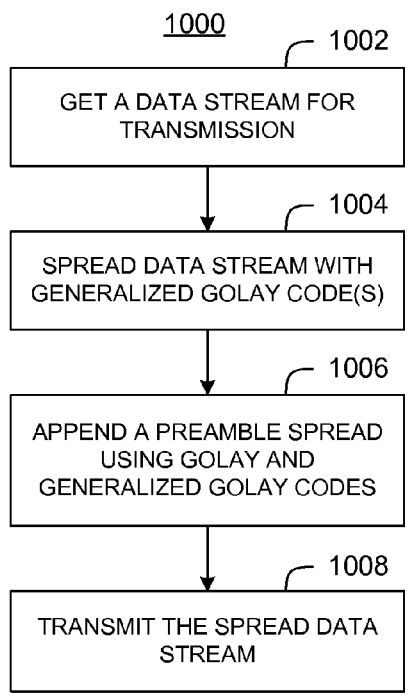
FIG. 10A illustrates example operations for spreading in accordance with certain aspects of the present disclosure.

FIG. 10A illustrates example operations 1000 that summarize the spread-spectrum coding applied at a transmission side of the wireless communication system. At 1002, an original transmission data stream may be obtained. Then, at 1004, the data stream may be may be spread using a generalized Golay spreading code which may be generated using the preferred Golay generator such as the one illustrated in FIG. 5A. At 1006, a spread preamble based on one or multiple Golay and generalized Golay codes is appended to the spread data stream before transmission to form a packet. At 1008, the spread data stream may be transmitted.

Figure 11A:
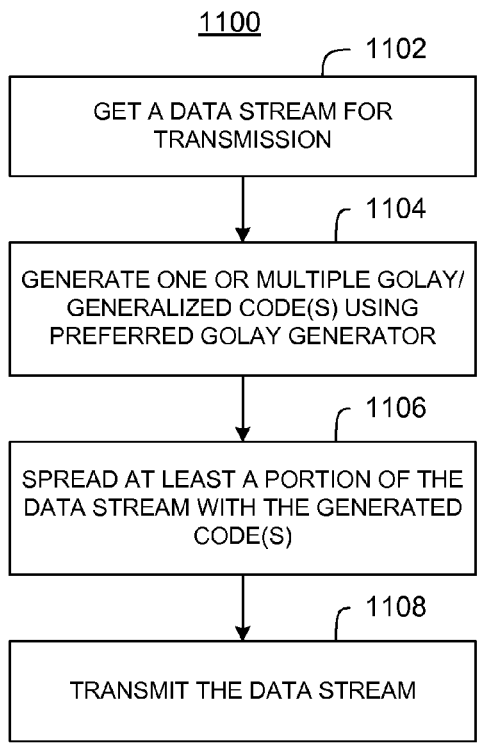
FIG. 11A illustrates example operations for Golay codes generation and spreading in accordance with certain aspects of the present disclosure.

FIG. 11A illustrates example operations 1100 that summarize the spread-spectrum coding applied at a transmission side of the wireless communication system. At 1102, an original transmission data stream may be obtained. Then, at 1104 one or multiple Golay and generalized Golay codes are generated using a preferred Golay generator such as the one illustrated in FIG. 5A. Then, at 1206, at least a portion of the data stream may be may be spread using the generated codes. At 1208, the spread data stream may be transmitted.

Figure 12A:
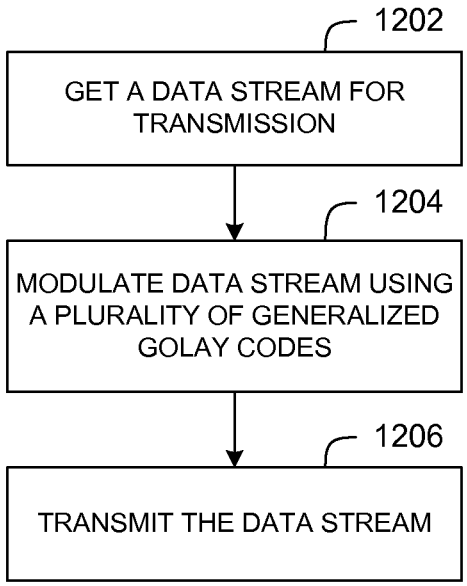
FIG. 12A illustrates example operations for combined spreading and modulation in accordance with certain aspects of the present disclosure.

FIG. 12A illustrates example operations 1200 that summarize the spread-spectrum modulation applied at a transmission side of the wireless communication system. At 1202, an original transmission data stream may be obtained. Then, at 1204 at least a portion of the data stream is modulated using a plurality of generalized Golay codes by encoding groups of K bits into one of the plurality of generalized Golay codes multiplied by a constellation point chosen from a constellation such as phase shift keying. At 1206, the modulated data stream may be transmitted.

Figure 10B:
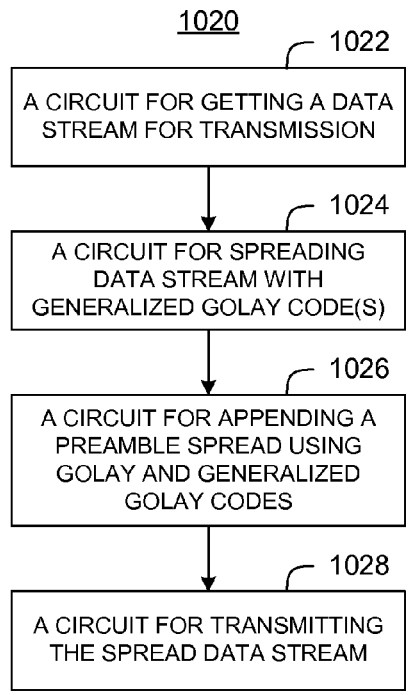
FIG. 10B illustrates example components capable of performing the operations illustrated in FIG. 10A.
Figure 11B:
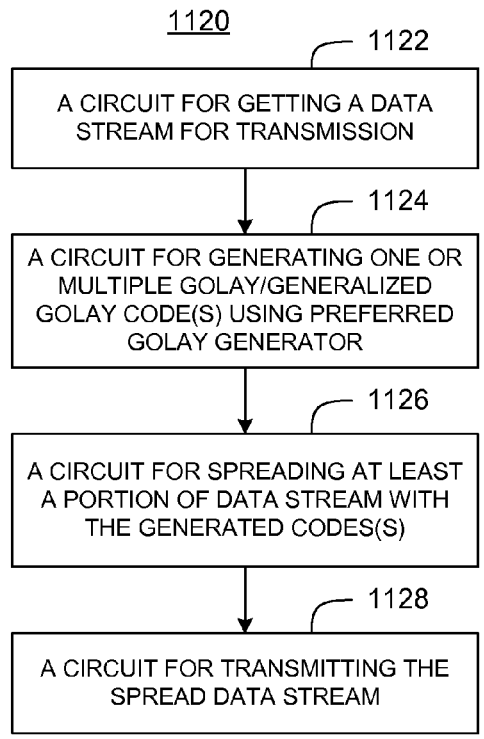
FIG. 11B illustrates example components capable of performing the operations illustrated in FIG. 11A.
Figure 12B:
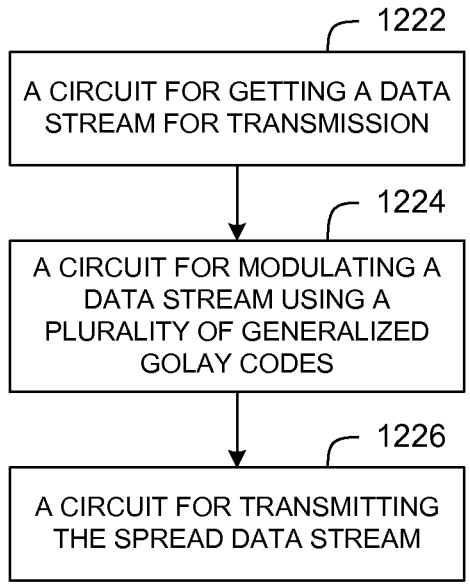
FIG. 12B illustrates example components capable of performing the operations illustrated in FIG. 12A.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, blocks 1002-1008, 1102-1108 and 1202-1206, illustrated in FIGS. 10A, 11A and 12A correspond to circuit blocks 1022-1028, 1122-1128, and 1222-1228 illustrated in FIGS. 10B, 11B and 12B.

Despreading of Received Signal

According to one aspect of the disclosure, a received spread data stream is processed at the receiver using a generalized efficient Golay correlator. As an example, the received signal 332' in FIG. 3, may be despread using a generalized efficient Golay correlator as part of the preamble detection & synchronization block 322' and/or as part of the block detection 316'.

Figure 8A:
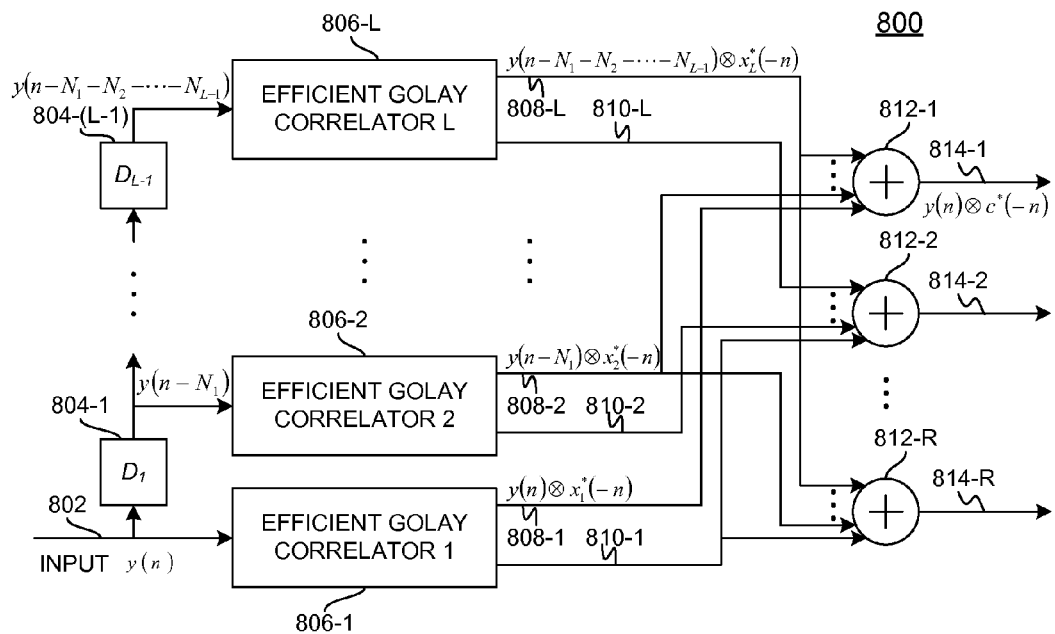
FIG. 8A illustrates an example generalized efficient Golay correlator that may be used within a wireless communication system in accordance with certain aspects of the present disclosure.

FIG. 8A shows a generalized efficient Golay correlator according to one aspect of the disclosure. The generalized Golay correlator functions as a matched filter to a spread transmitted signal using a generalized Golay sequence c(n) such as that illustrated in FIG. 6A. The generalized Golay correlator may also provides matched filtering to other generalized Golay codes constructed using the same constituent Golay codes as generalized Golay sequence c(n). The input signal 802, denoted here y(n), is input to a shift register composed of memory component 804-1 to memory component 804-(L−1). In the general case, the input signal 802 can be a complex number and may be represented using R-bits for its real part and R-bits for its imaginary part. In this case, memory component $D_1$ is composed of $N_1$ delay elements ($N_1$ being the length of the first Golay code 602-1 in FIG. 6A) where each delay element comprises 2R-bits, R-bits to store the real part and R-bits to store the imaginary part, and memory component $D_2$ is composed of $N_2$ delay elements ($N_2$ being the length of the first Golay code 602-2 in FIG. 6A) where each delay element comprises 2R-bits, R-bits to store the real part and R-bits to store the imaginary and so on. Signal 802, y(n), is input to a first efficient Golay correlator 806-1, and the output 808-1 is the convolution between input y(n) and a matched filter impulse response to the first Golay component 602-1 in FIG. 6A, i.e., output 808-1 equals to $y(n) \otimes x^*_1(-n)$. The second output 810-1 is the convolution between input y(n) and a matched filter impulse response to the complementary of the first Golay code $x_1(n)$. The output of memory component 804-1 is the input signal delayed by $N_1$ chips, i.e. $y(n-N_1)$ and is input to the second efficient Golay correlator 806-2. The output of 806-2 is the convolution between input $y(n-N_1)$ and a matched filter impulse response to the second Golay component 602-2 in FIG. 6A, i.e., output 808-2 equals to $y(n-N_1) \otimes x^*_1(-n)$. The second output 810-2 is the convolution between input $y(n-N_1)$ and a matched filter impulse response to the complementary of the second Golay code $x_2(n)$. The output of memory component 804-(L−1) is the input signal delayed by $N_1+N_2+ \ldots +N_{L-1}$ chips, i.e. $y(n-N_1-N_2- \ldots -N_{L-1})$ and is input to the $L^{th}$ efficient Golay correlator 806-L. The output of 806-L is the convolution between input $y(n-N_1-N_2- \ldots -N_{L-1})$ and a matched filter impulse response to the last Golay component 602-L in FIG. 6A, i.e., output 808-L equals to $y(n-N_1-N_2- \ldots -N_{L-1}) \otimes x^*_L(-n)$. The second output 810-L is the convolution between input $y(n-N_1-N_2- \ldots -N_{L-1})$ and a matched filter impulse response to the complementary of the $L^{th}$ Golay code $x_L(n)$. The outputs 808-1, 808-2, to 808-L of the matched filters to the Golay components are combined through adder 812-1 to yield a generalized Golay correlator/matched filter output 814-1, $y(n) \otimes c^*(-n)$. The outputs 801-1, 802-2 to 802-L and 810-1, 810-2 to 810-L can be combined in different ways to provide convolution between input signal y(n) and a multitude of generalized Golay codes constructed using the same constituent (components) Golay codes but different types as code c(n), i.e. the output 814-2 is the output of the convolution between y(n) and a matched filter to a second generalized Golay code, and 814-R is the output of the convolution between y(n) and a matched filter to an $R^{th}$ generalized Golay code. As an example, output 814-2 can be configured to provide the convolution between input y(n) and a matched filter to the pseudo-complementary of generalized Golay code c(n). Efficient Golay correlators 806-1 to 806-L may be implemented as shown in FIG. 4A or FIG. 4B.

According to one aspect of the disclosure, the memory components 804-1 to 804-(L−1) and the memory components in the first stages of efficient Golay correlators 806-1 to 806-L may be shared in order to reduce hardware complexity. An example of this aspect is provided next. Consider the matched filter implementation to the reverse of generalized Golay code of length 32

$$c=[b_1 b_2]=[+1,-1,+1,-1,+1,+1,-1,-1,+1,-1,-1,$$
$$+1,+1,+1,+1,+1,+1,-1,-1,+1,-1,-1,-1,-1,$$
$$+1,+1,-1,-1,-1,+1,-1,+1]$$

constructed from two Golay codes of type "b", code $b_1$ of length 16 generated using delay vector D=[8,2,4,1] and seed vector W=[+1,+1,+1,+1], and code $b_2$ of length 16 is generated using delay vector D=[8,1,4,2] and seed vector W= [+1,+1,+1,−1].

Figure 8B:
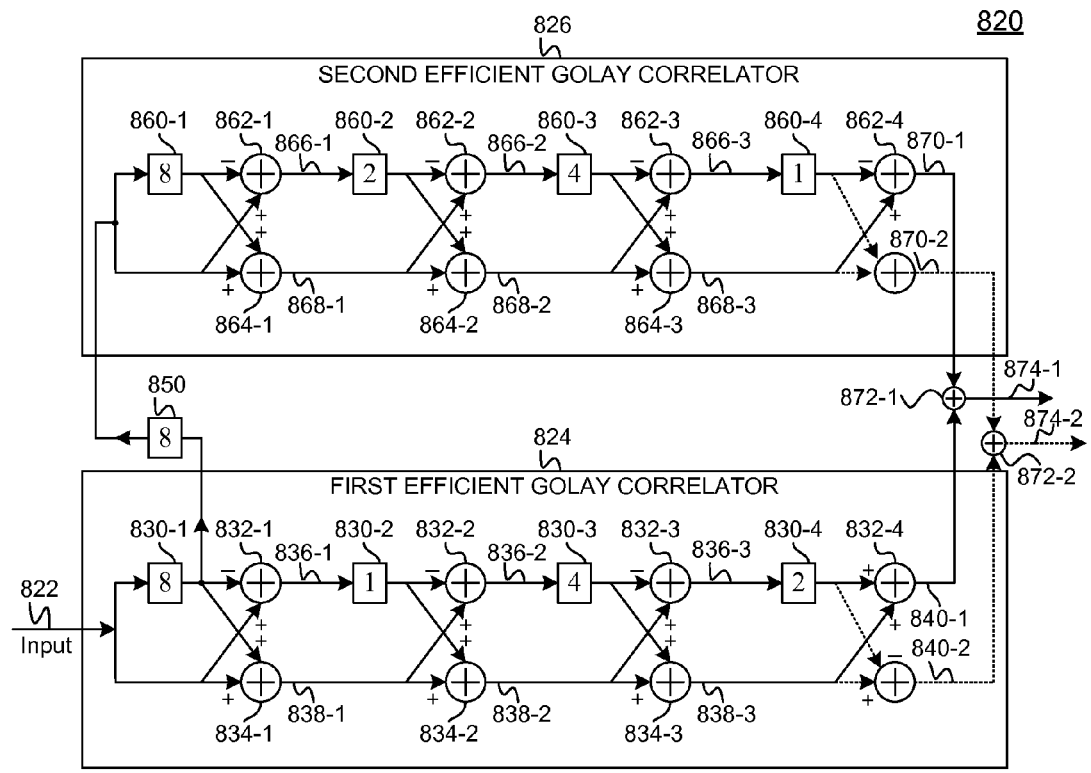
FIG. 8B illustrates example implementation generalized efficient Golay correlator that may be used within a wireless communication system in accordance with certain aspects of the present disclosure.

The generalized efficient Golay correlator/matched filter to a received signal spread with the reverse code c(N−n) is shown in FIG. 8B according to one aspect of the disclosure. The input signal 822 is fed to a first Golay efficient correlator 824. The memory components 830-1, 803-2, 830-3 and 830-4 comprise 8, 1, 4, and 2 delay elements corresponding to the delay vector D=[8,1,4,2]. Each delay element comprises 2R-bits, R-bits to store the real part and R-bits to store the imaginary part. In addition to memory components, the first efficient Golay correlator comprises subtractors 832-1, 832-2, and 832-3 and adders 834-1, 834-2, 834-3, and 834-4. The component 830-4 is an adder rather than a subtractor since the last seed element of the seed vector W=[+1,+1,+1,−1] is −1. The outputs of the first efficient Golay correlator 840-1 and 840-2 are the convolution between the input signal 822 and the matched filter response to codes $b_2$, and $a_2$ respectively. According to FIG. 8A, the input 802 should be delayed by $D_1$ chips ($D_1$=16) before being input to the second efficient Golay correlator. This is implemented in FIG. 8B by sharing the first memory component 830-1 of the first efficient Golay correlator and using the output of 830-1 to feed a second memory component 850 of 8 delay elements. This is equivalent to delaying the input signal 822 by 16 delay elements. Sharing more components between the first efficient Golay correlator 824 and the second efficient Golay correlator 826 is further possible depending on the delay vectors and seed vectors. The output of memory component 850 feeds the efficient Golay correlator 826. The second efficient Golay correlator 826 comprises memory components 860-1, 860-2, 860-3 and 860-4 set according to delay vector D=[8,2,4,1] of code $b_1$, a set of subtractors 862-1, 862-2, 862-3 and 862-4, and a set of adders 864-1, 864-2 and 864-3. The resulting outputs 870-1 and 870-2 of the second efficient Golay correlator 826 are the convolution between the input signal 822 and the matched filter response to codes $b_1$ and $a_1$ respectively with the overall results delayed by 16 chips. Finally, outputs 840-1 and 870-1 are combined through adder 872-1 to yield desired output 874-1 which is the output of the generalized Golay correlator/matched filter to code c(N−n). Combining outputs 840-2 and 870-2 through adder 872-2 to yields signal 874-2 which is the output of the generalized Golay correlator/matched filter to the pseudo-complementary code of code c(N−n).

In one aspect of the disclosure, the generalized efficient Golay correlator can be used to despread a modulated data stream with a pair of pseudo complementary generalized Golay codes. For example, the circuit in FIG. 8B provides two outputs 872-1 and 872-2 which may be the correlation between the received modulated data stream and two pseudo complementary generalized Golay codes. The two outputs can be used to decode the encoded bits within the data stream.

For high speed communication such as millimeter wave systems, it is advantageous to process the received signal in parallel according to one embodiment of the invention. As an example, if the received signal input 822 in FIG. 8B to be despread is demultiplexed by a factor of four; than the serial generalized Golay correlator shown in FIG. 8B can be modified accordingly and will be referred to as a generalized parallel Golay. The parallelization of the generalized Golay correlator in FIG. 8A will be illustrated with the example in FIG. 8B. It is sufficient to demonstrate the procedure for the efficient Golay correlator 824. Let y(n) be the input 822, and let $p_4$(n) be the output 840-1 and $q_4$(n) the output 840-2, and let Y(z), $P_4$(z), and $Q_4$(z) be their respective z-transforms. Than we have $$\begin{bmatrix} P_4(z) \\ Q_4(z) \end{bmatrix} = \begin{bmatrix} z^{-2} & 1 \\ -z^{-2} & 1 \end{bmatrix} \begin{bmatrix} -z^{-4} & 1 \\ z^{-4} & 1 \end{bmatrix} \begin{bmatrix} -z^{-1} & 1 \\ z^{-4} & 1 \end{bmatrix} \begin{bmatrix} -z^{-8} & 1 \\ z^{-8} & 1 \end{bmatrix} \begin{bmatrix} Y(z) \\ Y(z) \end{bmatrix}$$

The above can be implemented in the stages as follows $$\begin{bmatrix} P_4(z) \\ Q_4(z) \end{bmatrix} = \begin{bmatrix} z^{-2} & 1 \\ -z^{-2} & 1 \end{bmatrix} \begin{bmatrix} P_3(z) \\ Q_3(z) \end{bmatrix}, \begin{bmatrix} P_3(z) \\ Q_3(z) \end{bmatrix} = \begin{bmatrix} -z^{-4} & 1 \\ z^{-4} & 1 \end{bmatrix} \begin{bmatrix} P_2(z) \\ Q_2(z) \end{bmatrix},$$

$$\begin{bmatrix} P_2(z) \\ Q_2(z) \end{bmatrix} = \begin{bmatrix} -z^{-1} & 1 \\ z^{-1} & 1 \end{bmatrix} \begin{bmatrix} P_1(z) \\ Q_1(z) \end{bmatrix}, \begin{bmatrix} P_1(z) \\ Q_1(z) \end{bmatrix} = \begin{bmatrix} -z^{-8} & 1 \\ z^{-8} & 1 \end{bmatrix} \begin{bmatrix} P_2(z) \\ Q_2(z) \end{bmatrix}$$

Figure 9:
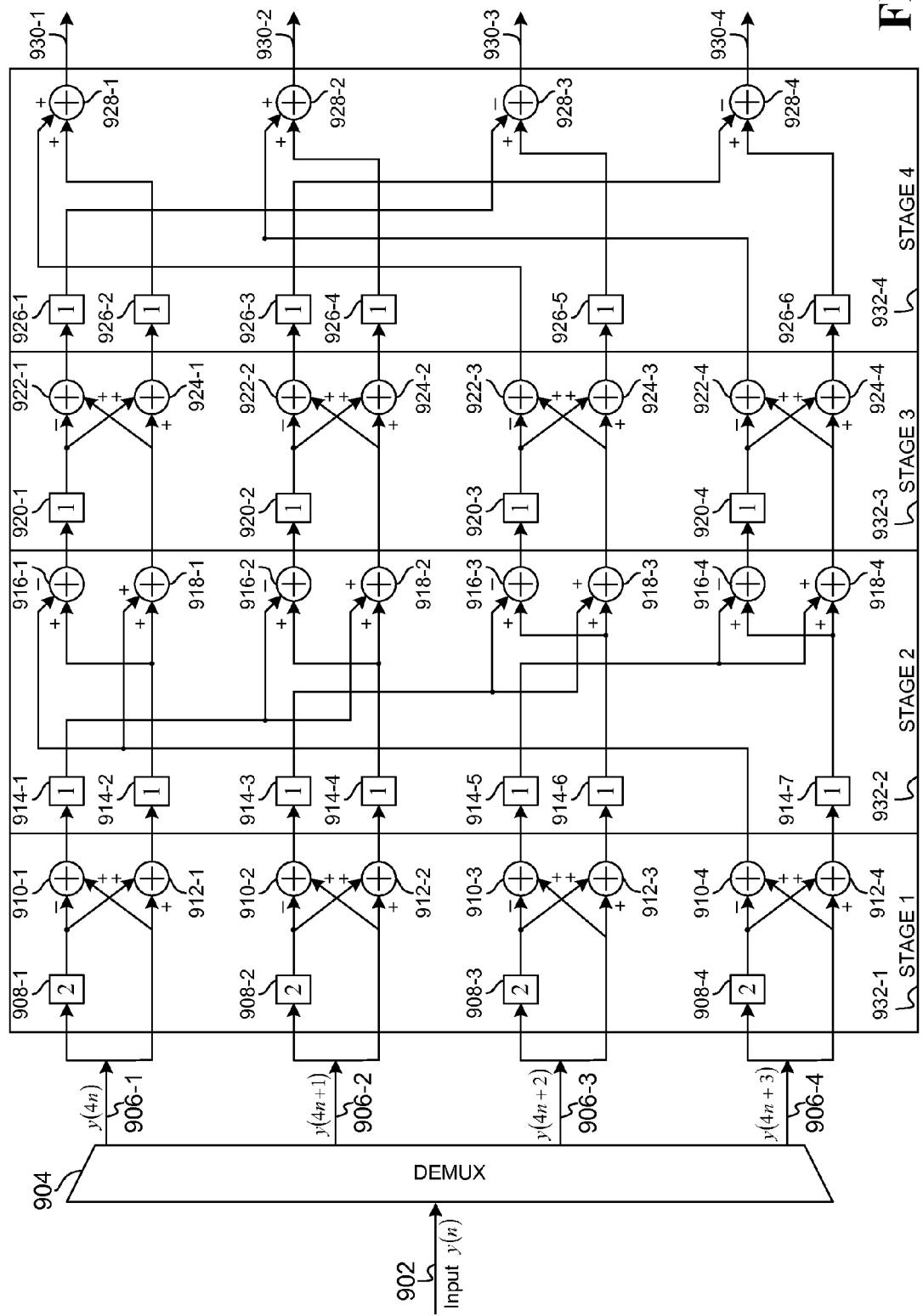
FIG. 9 illustrates an example generalized efficient parallel Golay correlator that may be used within a wireless communication system in accordance with certain aspects of the present disclosure.

Performing a polyphase decomposition of the above equations, using four phases, we obtain the circuit shown in FIG. 9. First four phases decomposition is applied to input signal 902. This is achieved using a demultiplexer 904 and the outputs 906-1 to 906-4 are the four phases of input signal y(n). If samples of the input signal 902 are incoming at a speed CLK, than each of signals 906-1 to 906-4 will be running at quarter the speed, i.e. at CLK/4. The first stage 932-1 computes the four phases of the partial correlation signals $P_1$(z) and $Q_1$(z). The delay $z^{-8}$ becomes a delay of 2 in the four phase decomposition. Therefore, memory components 908-1 to 908-4 comprise two delay elements each. The output of the delay elements along with the four phases of the input signal, i.e. 906-1 to 906-4, are input to subtractors 910-1 to 910-4 and adders 912-1 to 912-4. The outputs of the subtractors 910-1 to 910-4 are the four phases of signal $p_1$(n) and the outputs of the adders 912-1 to 912-4 are the four phases of signal $q_1$(n). The second stage 932-2 computes the four phases of signal $p_2$(n) and $q_2$(n). This stage contains memory components 914-1 to 914-7 comprising a single delay element each, subtractors 916-1 to 916-4, and adders 918-1 to 918-4. The interconnections between the output of delay components 914-1 to 914-7 and subtractors 916-1 to 916-4, and adders 918-1 to 918-4 correspond to the polyphase decomposition of matrix $$\begin{bmatrix} -z^{-1} & 1 \\ z^{-1} & 1 \end{bmatrix}$$

The third stage computes the four phases of signal $p_3$(n) and $q_3$(n) using memory components 920-1 to 914-4 comprising a single delay element each, subtractors 922-1 to 922-4, and adders 924-1 to 924-4. Like stage 1, the interconnections here between memory component 920-1 to 920-4 and subtractors 922-1 to 922-4, and adders 924-1 to 924-4 do not involve signals from other phases, i.e. subtractor 922-1 and adder 922-1 for the first phase for example do not use any signals from 920-2, 920-3 and 920-4 that is memory components from phases 2, 3, and 4. This is because the delay in the multiplication $$\begin{bmatrix} P_3(z) \\ Q_3(z) \end{bmatrix} = \begin{bmatrix} -z^{-4} & 1 \\ z^{-4} & 1 \end{bmatrix} \begin{bmatrix} P_2(z) \\ Q_2(z) \end{bmatrix}$$

is $z^{-4}$ and therefore no interconnections between the different phases is required. Finally, the fourth stage computes the four phases of the desired output $p_4(n)$. This stage comprises delay components 926-1 to 926-6 comprising a single delay element and adders 928-1 to 928-4. The outputs 930-1 to 930-4 are four phases of the desired output $p_4(n)$.

Therefore, according to one aspect of the disclosure, a received spread data stream may be despread using a generalized efficient parallel Golay correlator/matched filter.

When a data stream is not spread using a generalized Golay code, it is still possible to use a generalized (serial or parallel) Golay correlator to despread the signal. In this case, the generalized efficient (serial or parallel) Golay correlator acts as a mismatched filter rather than as a matched filter. As an example, consider a data stream that is spread using an m-sequence of length 15. First Golay decomposition is performed to find a generalized Golay code that is the closest to the m-sequence as possible. Closeness can be measured using different criterions such as minimum mean square error, hamming distance, etc. Once a generalized Golay code is found that is an approximation of the m-sequence, the spread data stream can be despread at the receiver using the efficient generalized Golay correlator which acts as a mismatched filter.

Aspects of the disclosure may be configurable for generating code sets, updating code sets, and/or reassigning user codes in response to demand for network resources, changes in the number of users accessing the network, individual user-access requirements, changes in signal-propagation characteristics (e.g., multipath, Doppler, path loss, etc.), and/or interference (e.g., inter-symbol interference, multiple-access interference, jamming, etc.). Aspects of the disclosure may provide for flexible code lengths, support multiple levels of Quality of Service (QoS), and/or allow for system overloading. Aspects of the disclosure may be optimized for minimum processing complexity, such as to enable suitability for real-time applications, rapid updates, low power consumption, and/or low cost processing components. Particular aspects of the disclosure may be configured to provide for the previously recited features and advantages and/or alternative features and advantages.

Figure 10C:
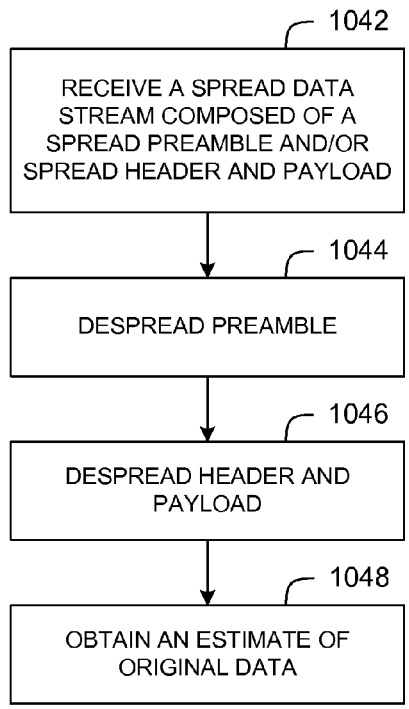
FIG. 10C illustrates an example operations for processing of spread signals at the receiver in accordance with certain aspects of the present disclosure.

FIG. 10C illustrates example operations 1040 that may be performed to process received spread signals. The receiving method provides for processing signals transmitted by a transmit-side signal processor (such as the receiver 304 in FIG. 3) after the signals have propagated through a multipath channel. Receiver front-end processing provides for down-converting and digitizing received signals in order to produce digital baseband signals.

At 1044, the baseband spread data stream composed of a spread preamble and a header/payload which might be spread as well. At 1046, the preamble is despread using a generalized efficient Golay correlator such as the one illustrated in FIG. 8A. At 1046, if the header and payload are spread using any spreading codes, than they are despread using a serial or parallel generalized efficient Golay correlator such as the ones illustrated in FIGS. 8A and 9.

Figure 11C:
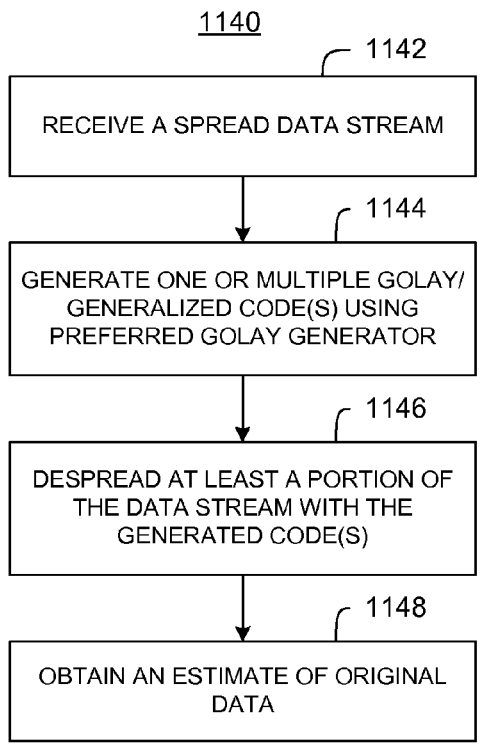
FIG. 11C illustrates an example operations for processing of spread signals at the receiver using preferred Golay generation methods in accordance with certain aspects of the present disclosure.

FIG. 11C illustrates example operations 1140 that may be performed to process received spread signals. The receiving method provides for processing signals transmitted by a transmit-side signal processor (such as the receiver 304 in FIG. 3) after the signals have propagated through a multipath channel. Receiver front-end processing provides for down-converting and digitizing received signals in order to produce digital baseband signals.

At 1144, the baseband spread data stream composed of a spread preamble and a header/payload which might be spread as well. At 1144, one or multiple Golay and Generalized Golay codes are generated using a preferred Golay generator such as the ones illustrated in FIGS. 5A and 6B. At 1146, at least a portion of the spread data stream despread using the one or multiple generated codes.

Figure 12C:
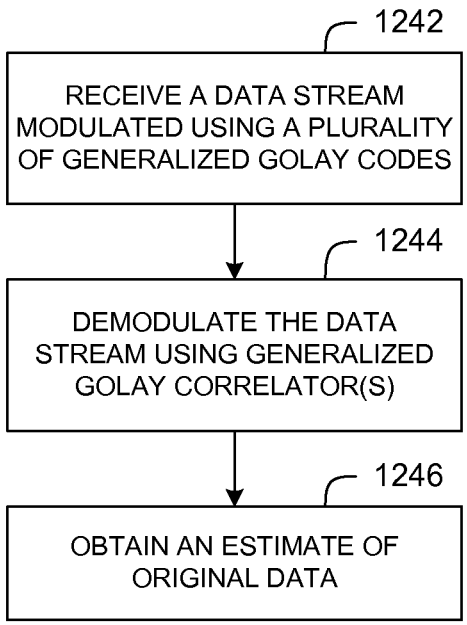
FIG. 12C illustrates an example operations for processing of spread and modulated signals at the receiver in accordance with certain aspects of the present disclosure.

FIG. 12C illustrates example operations 1240 that may be performed to process received modulated signals. The receiving method provides for processing signals transmitted by a transmit-side signal processor (such as the receiver 304 in FIG. 3) after the signals have propagated through a multipath channel. Receiver front-end processing provides for down-converting and digitizing received signals in order to produce digital baseband signals.

At 1244, the baseband modulated data stream is demodulated using a generalized Golay decoder such as the ones illustrated in FIGS. 8A, 8B and 9. At 1246, the original data is estimated using the output of the generalized Golay decoder.

Figure 10D:
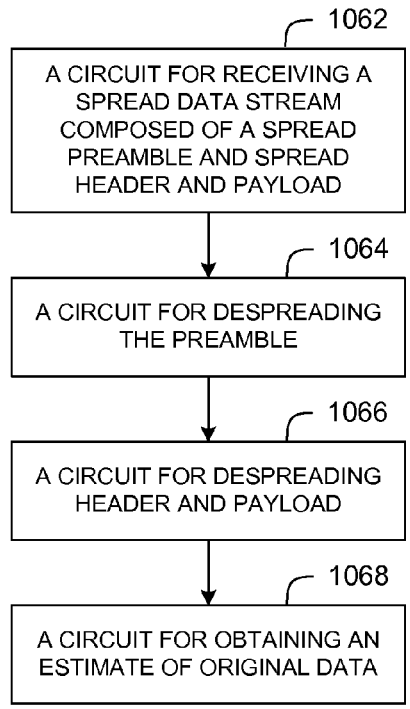
FIG. 10D illustrates example components capable of performing the operations illustrated in FIG. 10C.
Figure 11D:
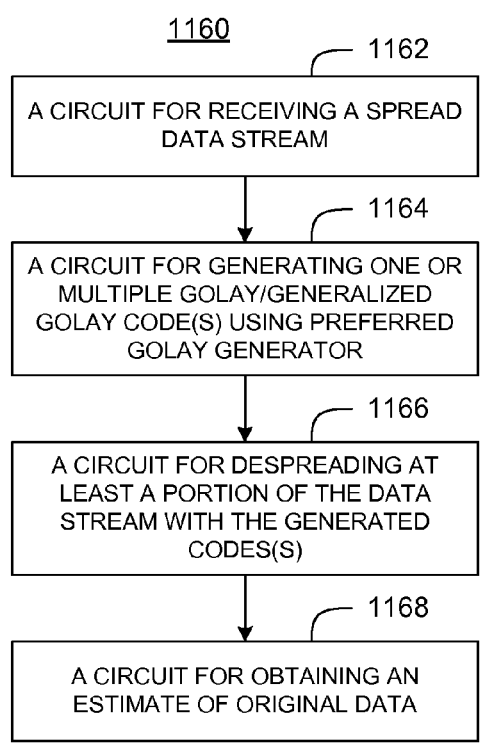
FIG. 11D illustrates example components capable of performing the operations illustrated in FIG. 11C.
Figure 12D:
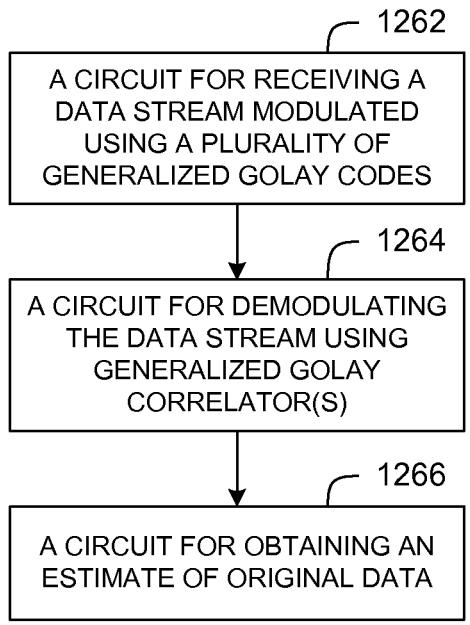
FIG. 12D illustrates example components capable of performing the operations illustrated in FIG. 12C.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, blocks 1042-1048, 1142-1148, and 1142-1146, illustrated in FIGS. 10C, 11C and 12C correspond to circuit blocks 1062-1068, 1162-1168, and 1262-1266 illustrated in FIGS. 10D, 11D and 12D.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in a base station, a mobile handset, a personal digital assistant (PDA) or other type of wireless device that operate in UWB part of spectrum with processing logic and elements to perform the techniques provided herein.

The invention claimed is:

1. A method for communication, comprising:
generating at least one spreading code using at least one Golay generator comprising M stages, each stage comprising a memory component, a first multiplier that multiplies the output of the memory component with an $m^{th}$ seed element of a seed vector, a second multiplier that multiplies the output signal of the first multiplier with an $m^{th}$ gating signal, an adder and a subtractor spreading at least a portion of a data stream with the at least one spreading code; and
transmitting the spread data stream.

2. The method of claim 1, wherein the at least one spreading code is a generalized Golay code formed of K constituent Golay codes and having a length N determined by $$N = \sum_{k=1}^{K} 2^{M_k}$$

where $K \geq 2$, and where a $k^{th}$ constituent Golay code has length $2^{M_k}$.

3. The method of claim 1, wherein each memory component comprises a number of delay elements, and wherein the total number of delay elements in the Golay generator is less than N−1, where N is the Golay code length.

4. The method of claim 3, wherein the total number of delay elements is M, wherein the seed vector is of length M, and wherein $N=2^M$.

5. The method of claim 1, wherein the Golay generator further comprises an M-bit counter and an M-bit control unit, and wherein an $m^{th}$ bit of the counter provides a clock signal or an enable signal of a corresponding $m^{th}$ stage, and wherein an $m^{th}$ bit output by the control unit provides the $m^{th}$ gating signal.

6. A method for communication, comprising:
receiving a spread data stream;
generating at least one spreading code using at least one Golay generator comprising M stages, each stage comprising a memory component, a first multiplier that multiplies the output of the memory component with an $m^{th}$ seed element of a seed vector, a second multiplier that multiplies the output signal of the first multiplier with an $m^{th}$ gating signal, an adder and a subtractor; and
despreading at least a portion of the received data stream with the at least one spreading code.

7. The method in claim 6, wherein the at least one spreading code is a generalized Golay code formed of K constituent Golay codes and having a length N determined by $$N = \sum_{k=1}^{K} 2^{M_k}$$

where $K \geq 2$, and where $k^{th}$ constituent Golay code has length $2^{M_k}$.

8. The method of claim 6, wherein each memory component comprises a number of delay elements, and wherein the total number of delay elements in the Golay generator is less than N−1, where N is the Golay code length.

9. The method of claim 8, wherein the total number of delay elements is M, wherein the seed vector is of length M, and wherein $N=2^M$.

10. The method of claim 6, wherein the Golay generator further comprises an M-bit counter and an M-bit control unit, and wherein an $m^{th}$ bit of the counter provides a clock signal or an enable signal of a corresponding $m^{th}$ stage, and wherein an $m^{th}$ bit output by the control unit provides the $m^{th}$ gating signal.

11. An apparatus for communications, comprising:
a generator for generating at least one spreading code using at least one Golay generator comprising M stages, each stage comprising a memory component, a first multiplier that multiplies the output of the memory component with an $m^{th}$ seed element of a seed vector, a second multiplier that multiplies the output signal of the first multiplier with an $m^{th}$ gating signal, an adder and a subtractor;
a spreader for spreading at least a portion of a data stream with the at least one spreading code; and
a transmitter for transmitting the spread data stream.

12. The apparatus of claim 11, wherein the at least one spreading code comprises is a generalized Golay code formed of K constituent Golay codes and having a length N determined by $$N = \sum_{k=1}^{K} 2^{M_k}$$

where $K \geq 2$, and where a $k^{th}$ constituent Golay code has length $2^{M_k}$.

13. The apparatus of claim 11, wherein the each memory component comprises a number of delay elements, and wherein the total number of delay elements in the Golay generator is less than N−1, where N is the Golay code length.

14. The apparatus of claim 13, wherein the total number of delay elements is M, where $N=2^M$ is the Golay code length.

15. The apparatus of claim 11, wherein the Golay generator further comprises an M-bit counter and an M-bit control unit, and wherein an $m^{th}$ bit of the counter provides a clock signal or an enable signal of a corresponding $m^{th}$ stage, and wherein an $m^{th}$ bit output by the control unit provides the $m^{th}$ gating signal.

16. The apparatus of claim 11, wherein the first multiplier is implemented using an XOR logic gate, and wherein the second multiplier is implemented using an AND logic gate.

17. An apparatus for communication, comprising:
a receiver for receiving a spread data stream;
a generator for generating at least one spreading code using at least one Golay generator comprising M stages, each stage comprising a memory component, a first multiplier that multiplies the output of the memory component with an $m^{th}$ seed element of a seed vector, a second multiplier that multiplies the output signal of the first multiplier with an $m^{th}$ gating signal, an adder and a subtractor; and
a despreader for despreading at least a portion of a received data stream with the at least one spreading code.

18. The apparatus of claim 17, wherein the spreading code comprises a generalized Golay code formed of K constituent Golay codes and having a length N determined by $$N = \sum_{k=1}^{K} 2^{M_k}$$

where $K \geq 2$, and where a $k^{th}$ constituent Golay code has length $2^{M_k}$.

19. The apparatus of claim 17, wherein each memory component comprises a number of delay elements, and wherein the total number of delay elements in the Golay generator is less than N−1, where N is the Golay code length.

20. The apparatus of claim 17, wherein the total number of delay elements is M, where $N=2^M$ is the Golay code length.

21. The apparatus of claim 17, wherein the Golay generator further comprises an M-bit counter and an M-bit control unit, and wherein an $m^{th}$ bit of the counter provides a clock signal or an enable signal of a corresponding $m^{th}$ stage, and wherein an $m^{th}$ bit output by the control unit provides the $m^{th}$ gating signal.

22. The apparatus of claim 17, wherein the first multiplier is implemented using an XOR logic gate, and wherein the second multiplier is implemented using an AND logic gate.

23. A method for communication, comprising:
generating at least one generalized Golay code by concatenating constituent Golay codes, the generalized Golay code having a length N determined by $$N = \sum_{k=1}^{K} 2^{M_k},$$

where $K \geq 2$, the number of constituent Golay codes, each $k^{th}$ constituent Golay code has length $2^{M_k}$, and N does not equal any Golay complementary sequence length; and
spreading at least a portion of a data stream with the at least one generalized Golay code; and
transmitting the spread data stream.

24. A method for communication, comprising:
receiving a spread data stream;
generating at least one generalized Golay code by concatenating constituent Golay codes, the at least one generalized Golay code having a length N determined by $$N = \sum_{k=1}^{K} 2^{M_k},$$

where $K \geq 2$, is the number of constituent Golay codes, each $k^{th}$ constituent Golay code has length $2^{M_k}$, and N does not equal any Golay complementary sequence length; and despreading at least a portion of the received data stream with the at least one generalized Golay code.

25. An apparatus for communications, comprising:
a generator for generating at least one generalized Golay code formed of concatenated constituent Golay codes and having a length N determined by $$N = \sum_{k=1}^{K} 2^{M_k},$$

where $K \geq 2$, is the number of constituent Golay codes, each $k^{th}$ constituent Golay code has length $2^{M_k}$, and N does not equal any Golay complementary sequence length;
a spreader for spreading at least a portion of a data stream with the at least one generalized Golay code; and
a transmitter for transmitting the spread data stream.

26. An apparatus for communication, comprising:
a receiver for receiving a spread data stream;
a generator for generating at least one generalized Golay code formed of concatenated constituent Golay codes and having a length N determined by $$N = \sum_{k=1}^{K} 2^{M_k},$$

where $K \geq 2$, is the number of constituent Golay codes, each $k^{th}$ constituent Golay code has length $2^{M_k}$, and N does not equal any Golay complementary sequence length; and
a despreader for despreading at least a portion of the received data stream with the at least one generalized Golay code.

27. The apparatus of claim 25, wherein the generator comprises K Golay generators, each Golay generator comprising $M_k$ stages, each stage comprising a memory component, a first multiplier that multiplies the output of the memory component with an $m^{th}$ seed element of a seed vector, a second multiplier that multiplies the output signal of the first multiplier with an $m^{th}$ gating signal, an adder, and a subtractor.

28. The apparatus of claim 26, wherein the generator comprises K Golay generators, each Golay generator comprising $M_k$ stages, each stage comprising a memory component, a first multiplier that multiplies the output of the memory component with an $m^{th}$ seed element of a seed vector, a second multiplier that multiplies the output signal of the first multiplier with an $m^{th}$ gating signal, an adder, and a subtractor.

* * * * *